(12) United States Patent
Kim et al.

(10) Patent No.: US 12,066,872 B2
(45) Date of Patent: Aug. 20, 2024

(54) HINGE ASSEMBLY AND ELECTRONIC DEVICE INCLUDING THE SAME

(71) Applicant: Samsung Electronics Co., Ltd., Suwon-si (KR)

(72) Inventors: Jongkeun Kim, Suwon-si (KR); Donghyun Byun, Suwon-si (KR); Sukjin Yun, Suwon-si (KR); Chongkun Cho, Suwon-si (KR); Yonghwa Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 17/836,495

(22) Filed: Jun. 9, 2022

(65) Prior Publication Data

US 2022/0413562 A1   Dec. 29, 2022

Related U.S. Application Data

(63) Continuation of application No. PCT/KR2022/006335, filed on May 3, 2022.

(30) Foreign Application Priority Data

Jun. 29, 2021  (KR) .................. 10-2021-0084457

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/0216* (2013.01); *H04M 1/0268* (2013.01); *H04M 2201/38* (2013.01)

(58) Field of Classification Search
CPC ........ G06F 1/1681; G06F 1/1652; G06F 1/16; G06F 1/1616; G06F 1/1628;
(Continued)

(56) References Cited

U.S. PATENT DOCUMENTS 11,259,428 B2 *  2/2022  Kang .................. H05K 5/0226
11,385,687 B1 *  7/2022  Kim ..................... G06F 1/1641
(Continued)

FOREIGN PATENT DOCUMENTS

KR   10-2009-0096350 A   9/2009
KR      10-1757477 B1    7/2017
(Continued)

OTHER PUBLICATIONS

International Search Report dated Aug. 1, 2022, issued in International Application No. PCT/KR2022/006335.

*Primary Examiner* — Lisa Lea-Edmonds
(74) *Attorney, Agent, or Firm* — Jefferson IP Law, LLP

(57) ABSTRACT

An electronic device is provided. The electronic device includes a display including a first area, a second area, and a folding area between the first area and the second area, a first housing configured to support the first area, a second housing configured to support the second area, and a hinge assembly configured to connect the first housing and the second housing, wherein the hinge assembly includes a hinge bracket including a pair of first rail structures formed to define a pair of hinge axes, a pair of hinge structures having one side connected to the first housing or the second housing and another side rotatably connected about the hinge axis along the first rail structure, and including a first cam structure. an intermediate member connected to the hinge bracket, and an elastic member configured to provide an elastic force to the intermediate member.

20 Claims, 31 Drawing Sheets

(58) Field of Classification Search
CPC ............. H04M 1/0216; H04M 1/0268; H04M 2201/38; H04M 1/022; F16C 11/04
See application file for complete search history.

(56) References Cited

U.S. PATENT DOCUMENTS

| | | | | |
|---|---|---|---|---|
| 11,625,073 | B2* | 4/2023 | Shim | G06F 1/1616 |
| | | | | 361/679.28 |
| 11,726,530 | B2* | 8/2023 | Kang | H04M 1/0268 |
| | | | | 361/679.27 |
| 11,886,257 | B2* | 1/2024 | Kim | G06F 1/1641 |
| 11,889,006 | B2* | 1/2024 | Kim | H04M 1/022 |
| 2020/0233466 | A1 | 7/2020 | Sanchez et al. | |
| 2020/0383220 | A1* | 12/2020 | Kang | G06F 1/1616 |
| 2021/0247815 | A1* | 8/2021 | Shim | G06F 1/1641 |
| 2021/0373612 | A1* | 12/2021 | Hwang | H04M 1/0268 |
| 2022/0413562 | A1* | 12/2022 | Kim | H04M 1/0216 |
| 2023/0229204 | A1* | 7/2023 | Shim | G06F 1/1652 |
| | | | | 361/679.28 |
| 2023/0236641 | A1* | 7/2023 | Han | G06F 1/1652 |
| | | | | 361/679.27 |
| 2023/0353665 | A1* | 11/2023 | Han | H04M 1/022 |
| 2023/0359252 | A1* | 11/2023 | Kang | G06F 1/1652 |
| 2023/0384838 | A1* | 11/2023 | Kim | G06F 1/1652 |
| 2024/0053803 | A1* | 2/2024 | Park | H04M 1/022 |

FOREIGN PATENT DOCUMENTS

| | | |
|---|---|---|
| KR | 10-2020-0120474 A | 10/2020 |
| KR | 10-2020-0138948 A | 12/2020 |
| KR | 10-2200430 B1 | 1/2021 |
| KR | 10-2257326 B1 | 5/2021 |
| KR | 10-2021-0068880 A | 6/2021 |
| KR | 10-2022-0016606 A | 2/2022 |

* cited by examiner

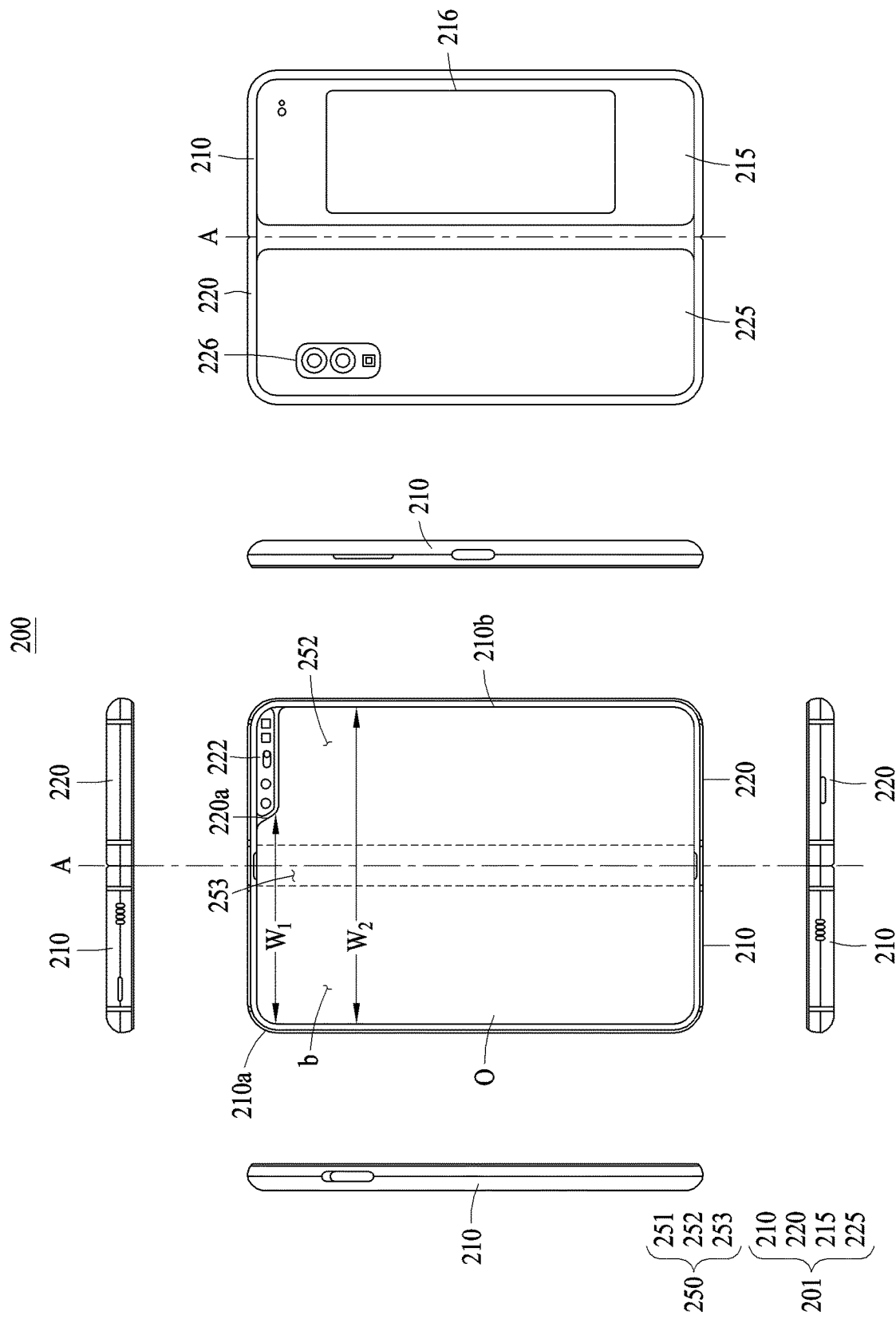

ABSTRACT# HINGE ASSEMBLY AND ELECTRONIC DEVICE INCLUDING THE SAME

CROSS-REFERENCE TO RELATED APPLICATIONS

This application is a continuation application, claiming priority under § 365(c), of an International application No. PCT/KR2022/006335, filed on May 3, 2022, which is based on and claims the benefit of a Korean patent application number 10-2021-0084457, filed on Jun. 29, 2021, in the Korean Intellectual Property Office, the disclosure of which is incorporated by reference herein in its entirety.

BACKGROUND

1. Field

The disclosure relates to a hinge assembly and an electronic device including the hinge assembly. More particularly, the disclosure relates to a hinge assembly that may generate a sufficient force while having a thin thickness, and an electronic device including the hinge assembly.

2. Description of Related Art

Recently, with the development of display-related technologies, electronic devices with flexible displays are being developed. A flexible display may be used in the form of a flat surface, and may also be deformed to be used in a specific shape. For example, an electronic device with a flexible display may be implemented in a foldable form to be folded or unfolded about at least one folding axis.

The above information is presented as background information only to assist with an understanding of the disclosure. No determination has been made, and no assertion is made, as to whether any of the above might be applicable as prior art with regard to the disclosure.

SUMMARY

To implement a folding operation or unfolding operation of an electronic device, a hinge assembly may be provided between a first housing and a second housing. The hinge assembly may have a structure for generating a force to maintain a predetermined folding state of the electronic device. To implement such a structure, the hinge assembly may use a cam structure and a spring. However, in a hinge assembly according to a related art, a cam structure may be tilted due to a gap between respective components. If the cam structure is tilted, it may be difficult to sufficiently transmit an elastic force of a spring, and an operation of the hinge assembly may not be smoothly implemented during a folding operation or unfolding operation due to an occurrence of an interference between the respective components.

Aspects of the disclosure are to address at least the above-mentioned problems and/or disadvantages and to provide at least the advantages described below. Accordingly, an aspect of the disclosure is to provide a hinge assembly that may generate a sufficient force while having a thin thickness, and an electronic device including the hinge assembly.

Another aspect of the disclosure is to provide a hinge assembly that may smoothly operate by correcting an abnormal operation, and an electronic device including the hinge assembly.

Another aspect of the disclosure is to provide a hinge assembly that may reduce a number of components to have a lightweight and slim structure, and an electronic device including the hinge assembly.

Additional aspects will be set forth in part in the description which follows and, in part, will be apparent from the description, or may be learned by practice of the presented embodiments.

In accordance with an aspect of the disclosure, an electronic device 300 is provided. The electronic device includes a display 250 including a first area 251, a second area 252, and a folding area 253 between the first area 251 and the second area 252, a first housing 311 configured to support the first area 251, a second housing 312 configured to support the second region 252, and a hinge assembly 400 configured to connect the first housing 311 and the second housing 312 and operate between a folded state in which the first area 251 and the second area 252 face each other and an unfolded state in which the first area 251 and the second area 252 do not face each other, wherein the hinge assembly 400 includes a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424.

In accordance with another aspect of the disclosure, a hinge assembly 400 applied to a foldable electronic device 300 including a first housing 311 and a second housing 312 is provided. The hinge assembly includes a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424.

In accordance with another aspect of the disclosure, an electronic device 300 is provided. The electronic device includes a display 250 including a first area 251, a second area 252, and a folding area 253 between the first area 251 and the second area 252, a first housing 311 configured to support the first area 251, a second housing 312 configured to support the second region 252, and a hinge assembly 400 configured to connect the first housing 311 and the second housing 312 and operate between a folded state in which the first area 251 and the second area 252 face each other and an unfolded state in which the first area 251 and the second area 252 do not face each other, wherein the hinge assembly 400 includes a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424. Each of the pair of hinge structures 420a and 420b includes a first body 421 fastened to the first housing 311 or the second housing 312, and a second body 422 extending from the first body 421 and including a second rail structure 423 rotatably coupled to the first rail structure 411a or 411b. The first cam structure 424 may be on one surface of the second rail structure 423. The intermediate member 320 includes a central portion 431 rotatably connected to the hinge bracket 410, and a pair of extensions 432a and 432b extending from the central portion 431 to both sides thereof and including the second cam structure 434a or 434b formed on one surface thereof. The elastic force of the elastic member 450a or 450b may generate torque for rotating the intermediate member 430 in a direction in which the second cam structure 434a or 434b is pressed toward the first cam structure 424.

According to various embodiments of the disclosure, it may be possible to reduce a thickness of a hinge assembly and generate a sufficient force, and also possible to reduce a thickness of an electronic device.

According to various embodiments of the disclosure, it may be possible to increase a quality of a folding operation or unfolding operation of a hinge assembly and an electronic device.

According to various embodiments of the disclosure, it may be possible to reduce a number of components of a hinge assembly and an electronic device and also possible to reduce a weight, a thickness, and a unit cost.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A is a diagram illustrating an unfolded state of an electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
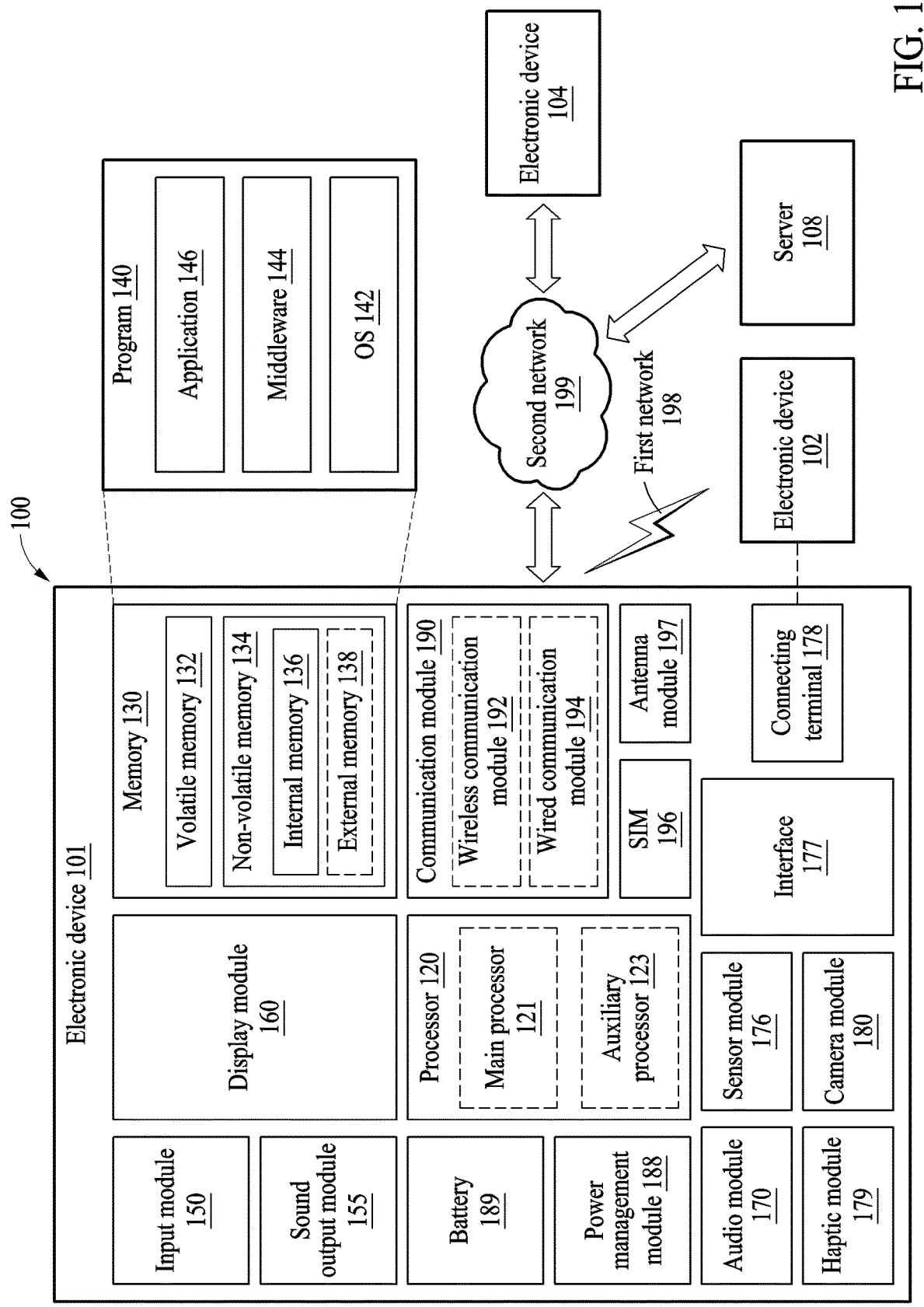
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the above components may be omitted from the electronic device 101, or one or more other components may be added in the electronic device 101. In some embodiments of the disclosure, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment of the disclosure, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment of the disclosure, the auxiliary processor 123 (e.g., an ISP or a CP) may be implemented as a portion of another component (e.g., the camera module 180 or the communication module 190) that is functionally related to the auxiliary processor 123. According to an embodiment of the disclosure, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment of the disclosure, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment of the disclosure, the display device 160 may include a touch sensor adapted to detect a touch, or a pressure sensor adapted to measure an intensity of a force incurred by the touch.

The audio module 170 may convert a sound into an electric signal or vice versa. According to an embodiment of the disclosure, the audio module 170 may obtain the sound via the input module 150 or output the sound via the sound output module 155 or an external electronic device (e.g., an electronic device 102, such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, ISPs, or flashes.

The power management module 188 may manage power supplied to the electronic device 101. According to an embodiment of the disclosure, the power management module 188 may be implemented as, for example, at least a part of a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment of the disclosure, another component (e.g., a radio frequency integrated circuit (RFIC)) other than the radiating element may be additionally formed as a part of the antenna module 197.

According to various embodiments of the disclosure, the antenna module 197 may form a mmWave antenna module. According to an embodiment of the disclosure, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment of the disclosure, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a diagram illustrating an unfolded state of an electronic device according to an embodiment of the disclosure.

Figure 2B:
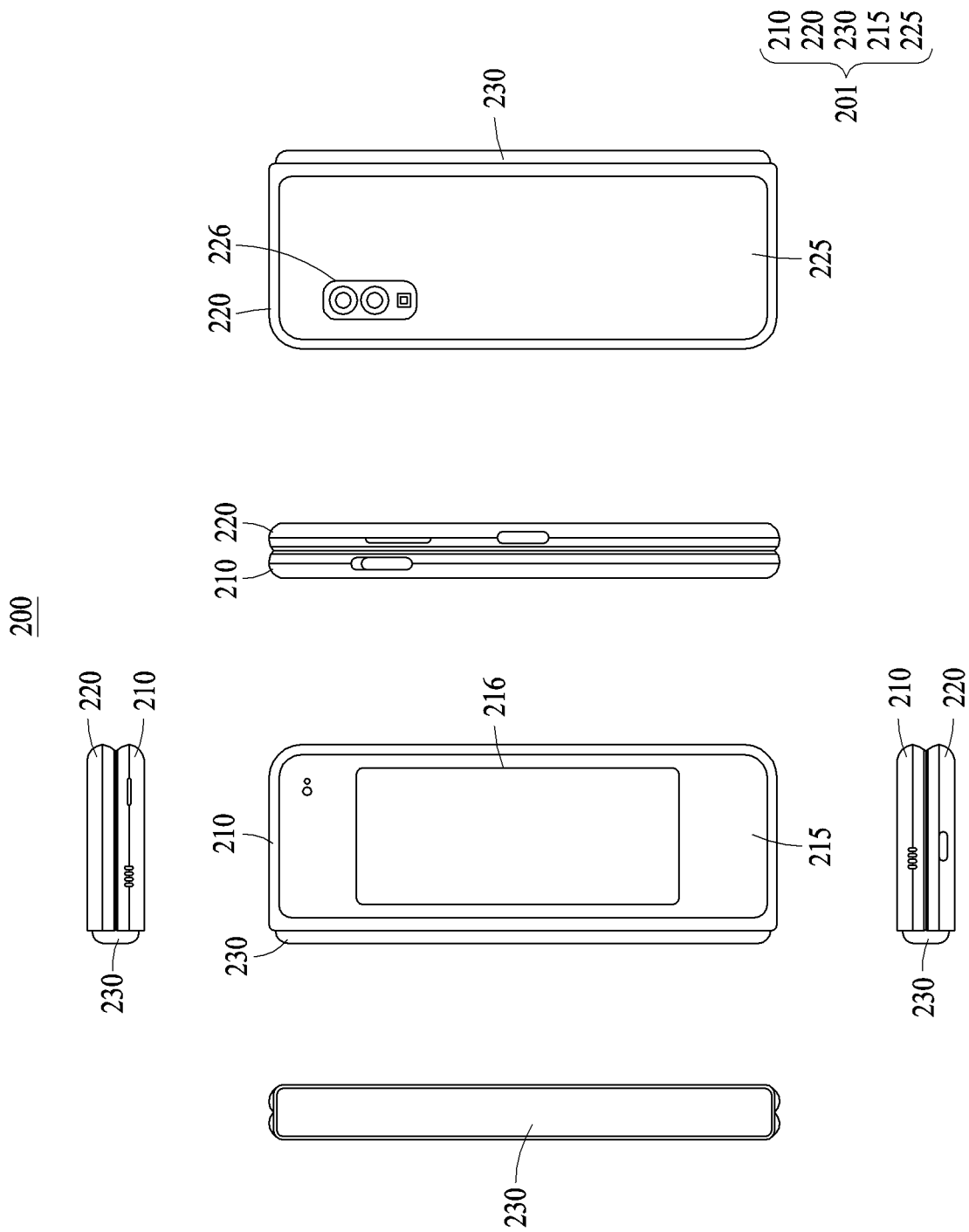
FIG. 2B is a diagram illustrating a folded state of an electronic device according to an embodiment of the disclosure.

FIG. 2B is a diagram illustrating a folded state of the electronic device according to an embodiment of the disclosure.

Figure 2C:
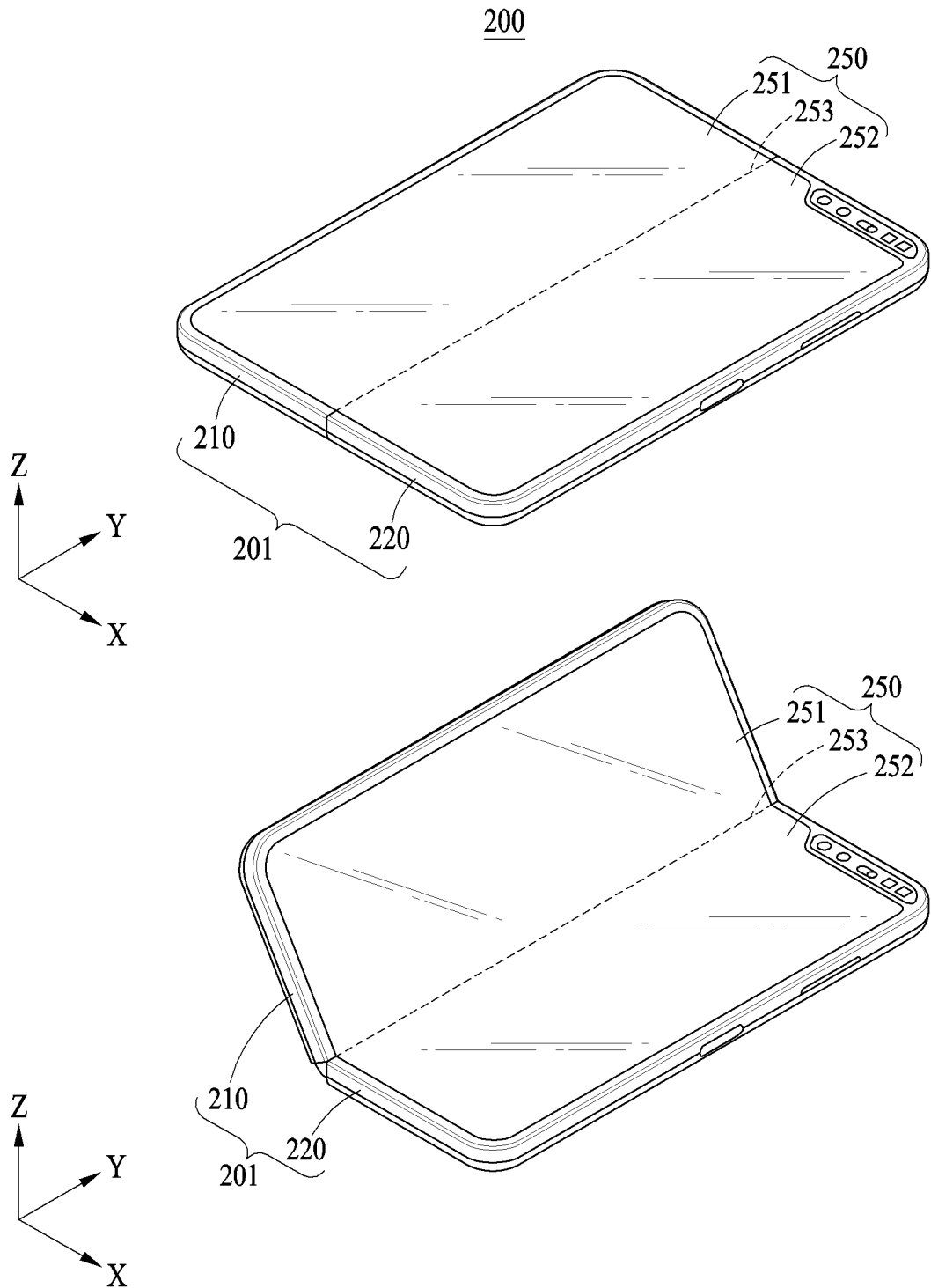
FIG. 2C is a perspective view illustrating a fully unfolded state or an intermediate state of an electronic device according to an embodiment of the disclosure.

FIG. 2C is a perspective view illustrating a fully unfolded state or an intermediate state of an electronic device according to an embodiment of the disclosure. In the disclosure, the intermediate state may be a state in which an electronic device is partially folded or unfolded.

The electronic device 200 of FIGS. 2A through 2C is an example of the electronic device 101 of FIG. 1, and may be a foldable or bendable electronic device.

In FIGS. 2C through 7F, a spatial coordinate system defined by an X-axis, a Y-axis, and a Z-axis orthogonal to each other is illustrated. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in an embodiment of the disclosure, the electronic device 200 may include a foldable housing 201, and a flexible or foldable display 250 (hereinafter, the "display" 250 in short) (e.g., the display module 160 of FIG. 1) disposed in a space formed by the foldable housing 201. According to an embodiment of the disclosure, a surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. Further, a surface surrounding a space between the front surface and the rear surface may be defined as a side surface of the electronic device 200.

According to various embodiments of the disclosure, the foldable housing 201 may include a first housing structure 210, a second housing structure 220 including a sensor area 222, a first rear cover 215, a second rear surface 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B, and may be implemented in a different shape or a different combination of components. For example, in an embodiment of the disclosure, the first housing structure 210 and the first rear cover 215 may be integrally formed, and the second housing structure 220 and the second rear cover 225 may be integrally formed.

According to various embodiments of the disclosure, the first housing structure 210 may be connected to the hinge structure 230 and may include a first surface facing a first direction, and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to an embodiment of the disclosure, the first surface may face the third surface in a state in which the electronic device 200 is fully folded, and the third direction may be identical to the first direction in a state in which the electronic device 200 is fully unfolded.

According to various embodiments of the disclosure, the first housing structure 210 and the second housing structure 220 may be disposed on both sides of a folding axis A, and may be generally symmetrical with respect to the folding axis A. An angle or a distance between the first housing structure 210 and the second housing structure 220 may vary depending on whether the electronic device 200 is in an unfolded state, a folded state, or an intermediate state (e.g., a partially folded state or a partially unfolded state), which will be described below. According to an embodiment of the disclosure, unlike the first housing structure 210, the second housing structure 220 may additionally include the sensor area 222 in which various sensors are arranged. However, the first housing structure 210 and the second housing structure 220 may have mutually symmetrical shapes in areas other than the sensor area 222.

According to various embodiments of the disclosure, as shown in FIG. 2A, the first housing structure 210 and the second housing structure 220 may together form a recess for accommodating the display 250. In an embodiment of the disclosure, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be greater than the first width w1. In an embodiment of the disclosure, the first portion 220a and the second portion 220b of the second housing structure 220 may be at different distances from the folding axis A. The widths of the recess are not limited to the shown example. In an embodiment of the disclosure, the recess may have a plurality of widths due to the shape of the sensor area 222 or asymmetrical portions of the first housing structure 210 and the second housing structure 220. According to various embodiments of the disclosure, the sensor area 222 may be formed to have a predetermined area adjacent to one corner of the second housing structure 220. However, the arrangement, shape, and size of the sensor area 222 are not limited to the shown example. For example, in an embodiment of the disclosure, the sensor area 222 may be provided at another corner of the second housing structure 220 or in a predetermined area between an upper corner and a lower corner. In an embodiment of the disclosure, components embedded in the electronic device 200 to perform various functions may be exposed to the front surface of the electronic device 200 through the sensor area 222 or through one or more openings provided in the sensor area 222. In various embodiments of the disclosure, the components may include various types of sensors. The sensors may include, for example, at least one of a front camera, a receiver, or a proximity sensor. According to various embodiments of the disclosure, the sensor region 222 may not be included in the second housing structure 220 or may be formed at a position different from that shown in the drawings.

According to various embodiments of the disclosure, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of the metal material may provide a ground plane for the electronic device 200, and may be electrically connected to a ground line formed on a PCB disposed in the foldable housing 201.

According to various embodiments of the disclosure, the first rear cover 215 may be disposed on one side of the folding axis A on the rear surface of the electronic device 200, and may have, for example, a substantially rectangular periphery that may be enclosed by the first housing structure 210. Similarly, the second rear cover 225 may be disposed on another side of the folding axis A on the rear surface of the electronic device 200, and may have a periphery that may be enclosed by the second housing structure 220.

According to various embodiments of the disclosure, the first rear cover 215 and the second rear cover 225 may be substantially symmetrical with respect to the folding axis A. However, the first rear cover 215 and the second rear cover 225 are not necessarily mutually symmetrical. In another example, the electronic device 200 may include a first rear cover 215 and a second rear cover 225 in various shapes. In an embodiment of the disclosure, the first rear cover 215 may be formed integrally with the first housing structure 210, and the second rear cover 225 may be formed integrally with the second housing structure 220.

According to various embodiments of the disclosure, the first rear cover 215, the second rear cover 225, the first housing structure 210, and the second housing structure 220 may form a space in which various components (e.g., a PCB, or a battery) of the electronic device 200 are to be disposed. In an embodiment of the disclosure, one or more components may be disposed or visually exposed on the rear surface of the electronic device 200. For example, at least a portion of a sub-display may be visually exposed through a first rear area 216 of the first rear cover 215. In another embodiment of the disclosure, one or more components or sensors may be visually exposed through a second rear area 226 of the second rear cover 225. In various embodiments of the disclosure, the sensors may include a proximity sensor and/or a rear camera.

According to various embodiments of the disclosure, a front camera exposed to the front surface of the electronic device 200 through one or more openings provided in the sensor area 222, or a rear camera exposed through the second rear area 226 of the second rear cover 225 may include one or more lenses, an image sensor, and/or an image signal processor. A flash may include, for example, a light emitting diode (LED) or a xenon lamp. In some embodiments of the disclosure, two or more lenses (e.g., infrared camera, wide-angle, and telephoto lenses) and image sensors may be disposed on one surface of the electronic device 200.

Referring to FIG. 2B, the hinge cover may be disposed between the first housing structure 210 and the second housing structure 220 to cover internal components (e.g., the hinge structure 230). According to an embodiment of the disclosure, the hinge structure 230 may be covered by a portion of the first housing structure 210 and a portion of the second housing structure 220, or may be exposed to the outside, depending on the state of the electronic device 200 (e.g., the unfolded state, the intermediate state, or the folded state.

According to an embodiment of the disclosure, when the electronic device 200 is in the unfolded state (e.g., a fully unfolded state), as shown in FIG. 2A, the hinge structure 230 may be covered by the first housing structure 210 and the second housing structure 220 and may not be exposed to the outside. In another example, when the electronic device 200 is in the folded state (e.g., a fully folded state), as shown in FIG. 2B, the hinge structure 230 may be exposed to the outside between the first housing structure 210 and the second housing structure 220. In another example, when the first housing structure 210 and the second housing structure 220 are in the intermediate state that the first housing structure 210 and the second housing structure 220 are folded with a certain angle, a portion of the hinge structure 230 may be exposed to the outside between the first housing structure 210 and the second housing structure 220. However, the area exposed in this example may be smaller than that in the fully folded state. In an embodiment of the disclosure, the hinge structure 230 may include a curved surface.

According to various embodiments of the disclosure, the display 250 may be disposed in a space formed by the foldable housing 201. For example, the display 250 may be seated on the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to various embodiments of the disclosure, the display 250 may refer to a display in which at least one area is deformable into a planar surface or a curved surface. In an embodiment of the disclosure, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, the area division of the display 250 shown in FIG. 2A is merely an example, and the display 250 may be divided into a plurality of areas (e.g., four or more areas, or two areas) depending on the structure or functions thereof. In an example, as shown in FIG. 2A, the display 250 may be divided into areas based on the folding area 203 extending in parallel to the folding axis A. In another example, the display 250 may be divided into areas based on another folding axis (e.g., a folding axis parallel to a width direction of an electronic device).

According to various embodiments of the disclosure, the display 250 may be coupled to or disposed adjacent to a touch detection circuit, and/or a touch panel with a pressure sensor for measuring an intensity (pressure) of a touch. For example, the display 250, which is an example of a touch panel, may be coupled to or disposed adjacent to a touch panel for detecting an electromagnetic resonance (EMR) type stylus pen.

According to various embodiments of the disclosure, the first area 251 and the second area 252 may be generally symmetrical with respect to the folding area 253. However, unlike the first area 251, the second area 252 may include a notch cut according to the presence of the sensor area 222, but may be symmetrical to the first area 251 in the other areas. In other words, the first area 251 and the second area 252 may include mutually symmetrical portions and mutually asymmetrical portions.

According to various embodiments of the disclosure, an edge thickness of each of the first area 251 and the second area 252 may be different from an edge thickness of the folding area 253. The edge thickness of the folding area 253 may be less than those of the first area 251 and the second area 252. The first area 251 and the second area 252 may have an asymmetrical structure in terms of the thickness, when viewed in cross sections of the first area 251 and the second area 252. For example, an edge of the first area 251 may be formed to have a first radius of curvature, and an edge of the second area 252 may be formed to have a second radius of curvature different from the first radius of curvature. In an embodiment of the disclosure, the first area 251 and the second area 252 may have a symmetrical structure in terms of the thickness, when viewed in the cross sections of the first area 251 and the second area 252.

Hereinafter, each area of the display 250, and operations of the first housing structure 210 and the second housing structure 220 depending on the state (e.g., a folded state, the unfolded state, or the intermediate state) of the electronic device 200) will be described.

According to various embodiments of the disclosure, when the electronic device 200 is in the unfolded state (e.g., FIG. 2A), the first housing structure 210 and the second housing structure 220 may be arranged to face the same direction while forming an angle of 180 degrees. The surface of the first area 251 of the display 250 and the surface of the second area 252 thereof may face the same direction (e.g., a front direction of an electronic device) while forming an angle of 180 degrees. The folding area 253 may form the same plane together with the first area 251 and the second area 252.

According to various embodiments of the disclosure, when the electronic device 200 is in the folded state (e.g., FIG. 2B), the first housing structure 210 and the second housing structure 220 may be arranged to face each other. The surface of the first area 251 and the surface of the second area 252 of the display 250 may face each other while forming a narrow angle (e.g., an angle between 0 degrees to 10 degrees). At least a portion of the folding area 253 may form a curved surface having a predetermined curvature.

According to various embodiments of the disclosure, when the electronic device 200 is in the intermediate state, the first housing structure 210 and the second housing structure 220 may be arranged to form a certain angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be smaller than that in the folded state.

An upper part of FIG. 2C illustrates a state in which the electronic device 200 is fully unfolded, and a lower part of FIG. 2C illustrates an intermediate state in which in which the electronic device 200 is partially unfolded. As described above, the state of the electronic device 200 may be changed to the folded state or the unfolded state. According to an embodiment of the disclosure, when viewed in a direction of a folding axis (e.g., the folding axis A of FIG. 2A), the electronic device 200 may be folded in two types, i.e., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type and the out-folding type are combined.

The in-folding type may refer to a state in which the display 250 is not exposed to the outside in the fully folded state. The out-folding type may refer to a state in which the display 250 is exposed to the outside in the fully folded state. The lower part of FIG. 2C shows an intermediate state in which the electronic device 200 is partially unfolded in an in-folding process.

Although the state in which the electronic device 200 is folded in the in-folding type will be described below for convenience's sake, it should be noted that the description may be similarly applied in the state in which the electronic device 200 is folded in the out-folding type.

The electronic device according to various embodiments of the disclosure may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments of the disclosure and include various changes, equivalents, or replacements for a corresponding embodiment of the disclosure. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms, such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments of the disclosure as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 3:
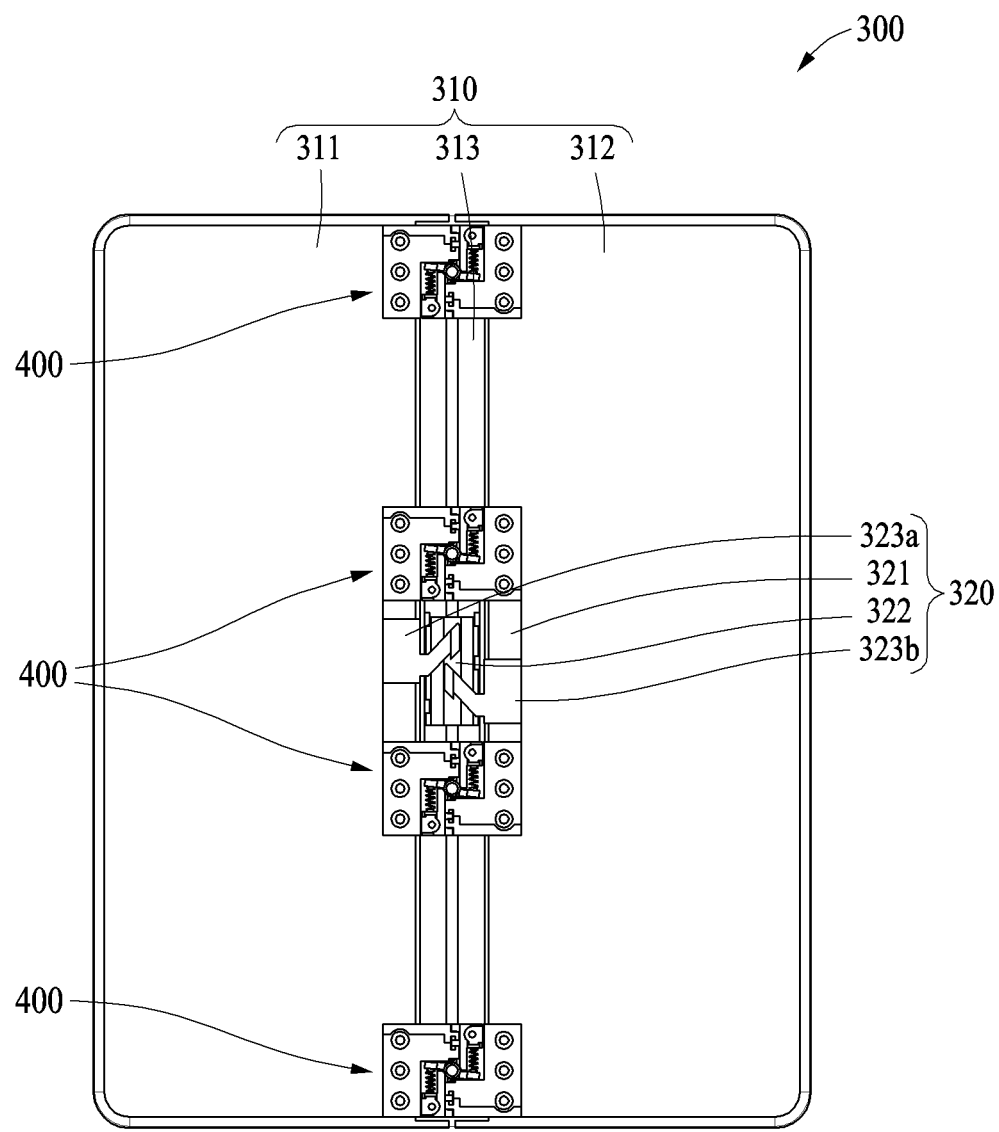
FIG. 3 is a front view illustrating a state in which a hinge assembly is applied in an electronic device according to an embodiment of the disclosure.

FIG. 3 is a front view illustrating a state in which a hinge assembly is applied in an electronic device according to an embodiment of the disclosure.

Referring to FIG. 3, an electronic device 300 (e.g., the electronic device 101 of FIG. 1 or the electronic device 200 of FIGS. 2A through 2C) according to an embodiment of the disclosure may be a foldable electronic device. For example, the electronic device 300 may be folded or unfolded about a folding axis A. However, FIG. 3 is merely an example, and a size, shape, structure, and folding axis of the electronic device 300 are not limited thereto. For example, the electronic device 300 of FIG. 3 may include the folding axis A extending in a Y-axis direction, which is the longitudinal direction of the device, but an electronic device according to an embodiment of the disclosure may also include a folding axis extending in an X-axis direction which is the latitudinal direction.

The electronic device 300 according to an embodiment of the disclosure may include a housing 310 (e.g., the foldable housing 201 of FIGS. 2A through 2C), a display (not shown) (e.g., the display module 160 of FIG. 1, or the display 250 of FIGS. 2A through 2C), a hinge assembly 400, and a sync assembly 320.

In an embodiment of the disclosure, the housing 310 may form at least a portion of external surfaces of the electronic device 300. The housing 310 may include a first housing 311 (e.g., the first housing structure 210 of FIGS. 2A through 2C), a second housing 312 (e.g., the second housing structure 220 of FIGS. 2A through 2C), and a hinge housing 313.

In an embodiment of the disclosure, the first housing 311 and the second housing 312 may be foldably connected to each other by the hinge assembly 400. An angle or distance between the first housing 311 and the second housing 312 may vary depending on whether the electronic device 300 is in a flat state or unfolded state, a folded state, or an intermediate state. The hinge housing 313 may be disposed between the first housing 311 and the second housing 312 to provide a space for mounting internal components (e.g., the hinge assembly 400 and/or the sync assembly 320). For example, the hinge housing 313 may be configured to cover the hinge assembly 400 and/or the sync assembly 320 so that the hinge assembly 400 and/or the sync assembly 320 may not be exposed to the outside.

In an embodiment of the disclosure, the first housing 311 and the second housing 312 may provide a space in which the display 250 is disposed. The display 250 may be a foldable flexible display. For example, the display 250 may include a first area (e.g., the first area 251 of FIG. 2C), a second area (e.g., the second area 252 of FIG. 2C), and a folding area (e.g., the folding area 253 of FIG. 2C) between the first area and the second area. The first housing 311 may be disposed at a position corresponding to the first area 251 of the display 250 to support the first area 251 of the display 250. The second housing 312 may be disposed at a position corresponding to the second area 252 of the display 250 to support the second area 252 of the display 250.

In an embodiment of the disclosure, the hinge assembly 400 may be disposed between the first housing 311 and the second housing 312 to connect the first housing 311 and the second housing 312. For example, the hinge structure 230 of FIG. 2B may include a plurality of hinge assemblies 400. The plurality of hinge assemblies 400 may be spaced apart along the folding axis A. For example, as shown in FIG. 3, four hinge assemblies 400 may be spaced apart along the folding axis A. However, this is merely an example, and a number of hinge assemblies 400 is not limited thereto. The hinge assembly 400 may implement folding or unfolding operations of the electronic device 300. The hinge assembly 400 may operate between a folded state in which the first area 251 and the second area 252 face each other and an unfolded state in which the first area 251 and the second area 252 do not face each other. The hinge assembly 400 may generate a force to maintain a specific folded state of the electronic device 300. For example, when the electronic device 300 is in the folded state, the hinge assembly 400 may generate a force for allowing the electronic device 300 to remain in the folded state. When the electronic device 300 is in the unfolded state, the hinge assembly 400 may generate a force for allowing the electronic device 300 to remain in the unfolded state. When the electronic device 300 is in the intermediate state, the hinge assembly 400 may generate a force for allowing the electronic device 300 to remain in the intermediate state. The hinge assembly 400 will be further described below.

In an embodiment of the disclosure, the sync assembly 320 may be disposed between the first housing 311 and the second housing 312 and may synchronize folding angles between the first housing 311 and the second housing 312. For example, the sync assembly 320 may include a bracket 321, a slider 322, and a pair of rotators 323a and 323b. The bracket 321 may be disposed between the first housing 311 and the second housing 312. For example, the bracket 321 may be fixedly connected to the hinge housing 313. The slider 322 may be connected to the bracket 321 to be movable in the direction of the folding axis A with respect to the bracket 321. One side of each of the rotators 323a and 323b may be connected to the first housing 311 or the second housing 312, and another side may be connected to the slider 322. When the first housing 311 or the second housing 312 is folded about the folding axis A, the folding angles between the first housing 311 and the second housing 312 may be synchronized by a helical rotation of the pair of rotators 323a and 323b and a movement of the slider 322 in the direction of the folding axis A. However, this is merely an example, and the structure of the sync assembly 320 is not limited thereto. For example, the sync assembly 320 may also synchronize the folding angles between the first housing 311 and the second housing 312 through a gear structure.

Figure 4A:
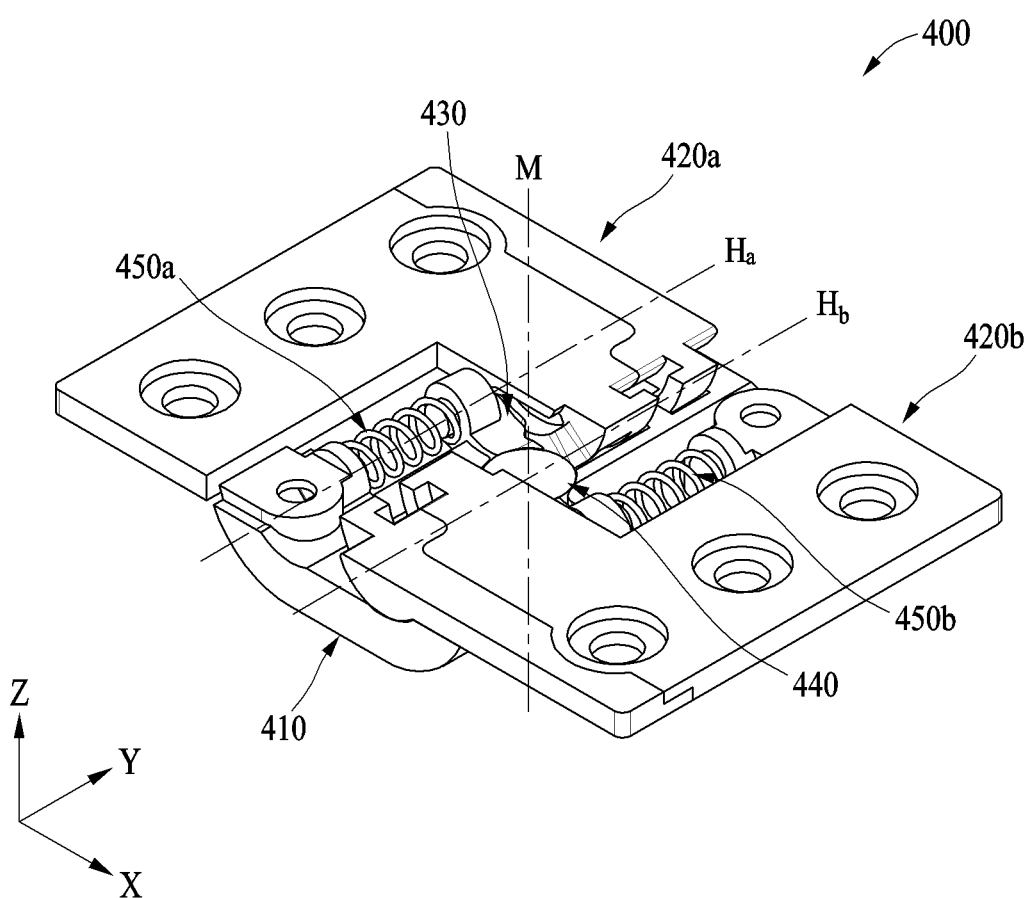
FIG. 4A is a perspective view illustrating an unfolded state of a hinge assembly according to an embodiment of the disclosure.
Figure 4B:
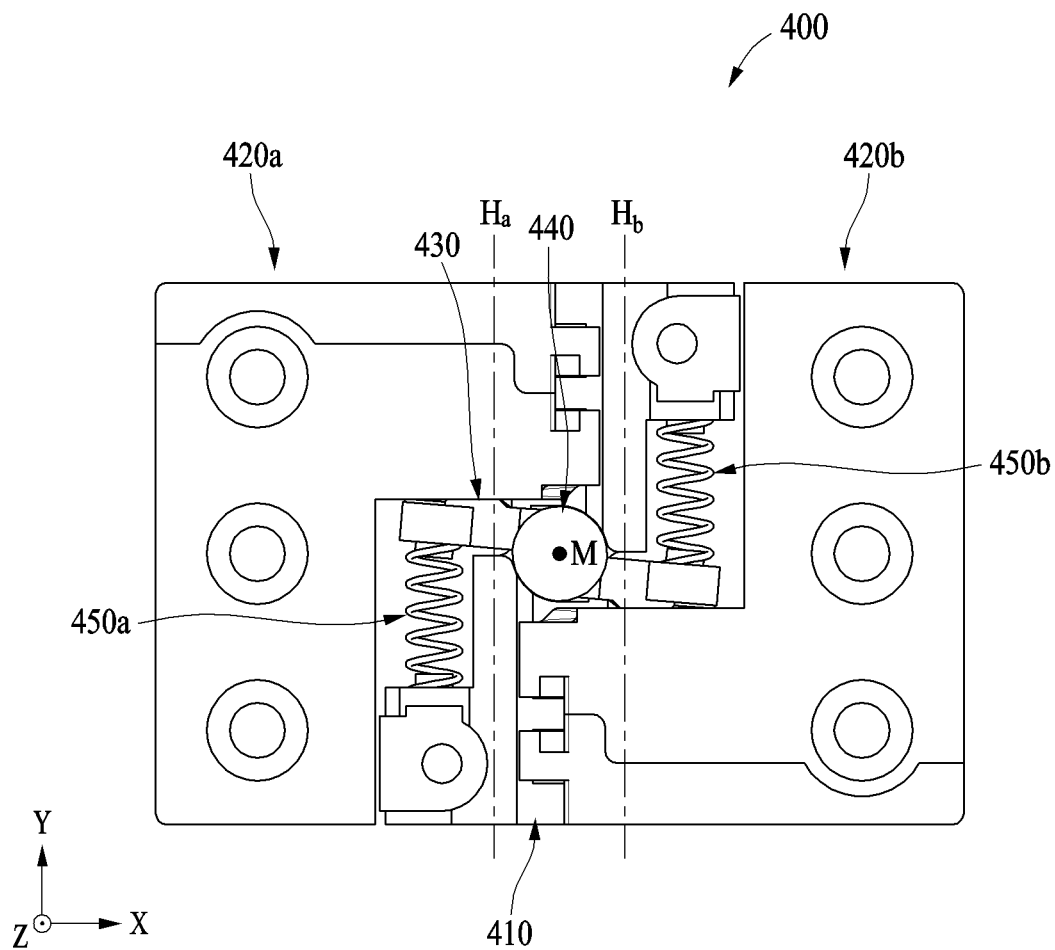
FIG. 4B is a front view illustrating an unfolded state of a hinge assembly according to an embodiment of the disclosure.
Figure 4C:
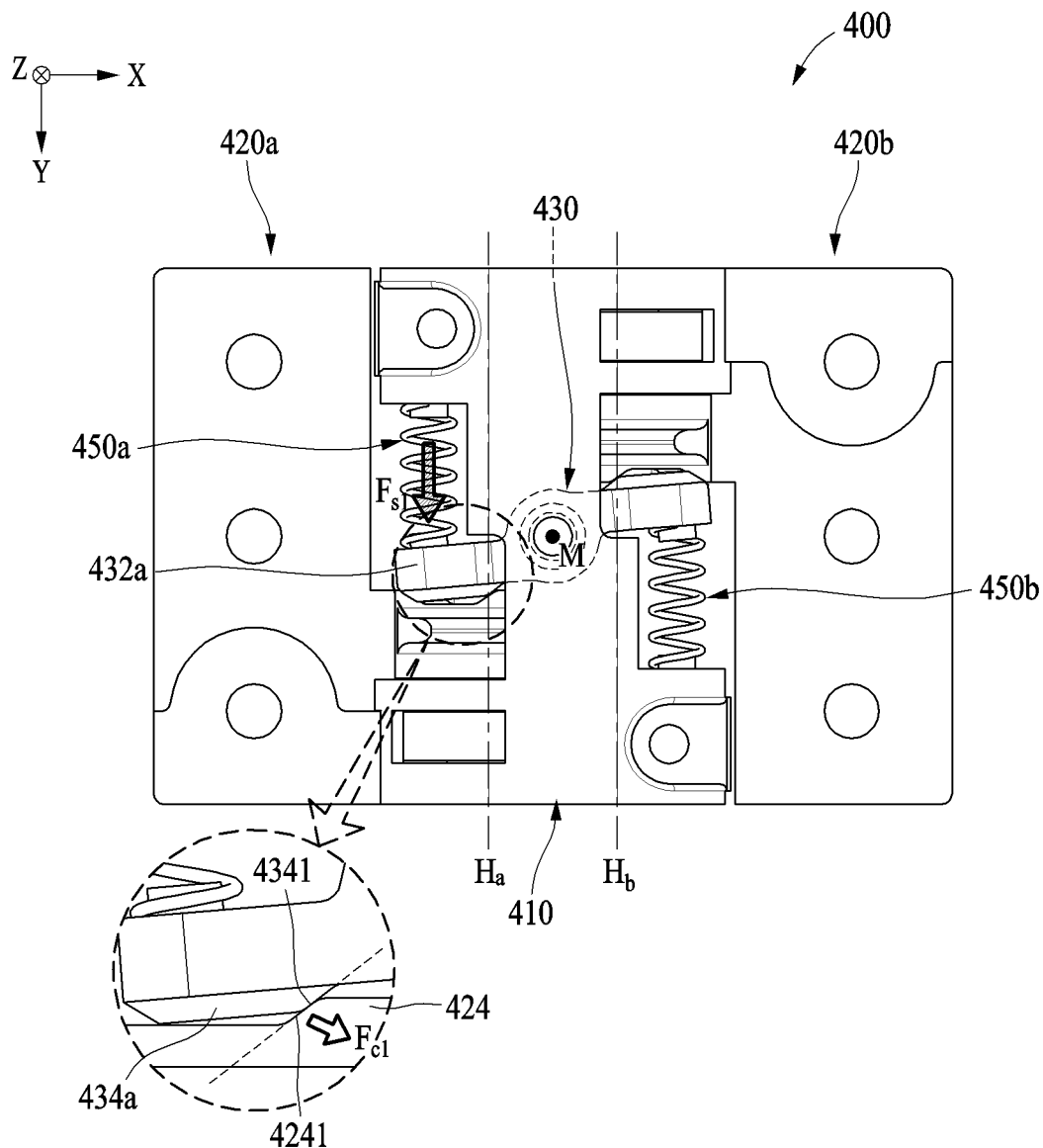
FIG. 4C is a rear view illustrating an unfolded state of a hinge assembly according to an embodiment of the disclosure.
Figure 4D:
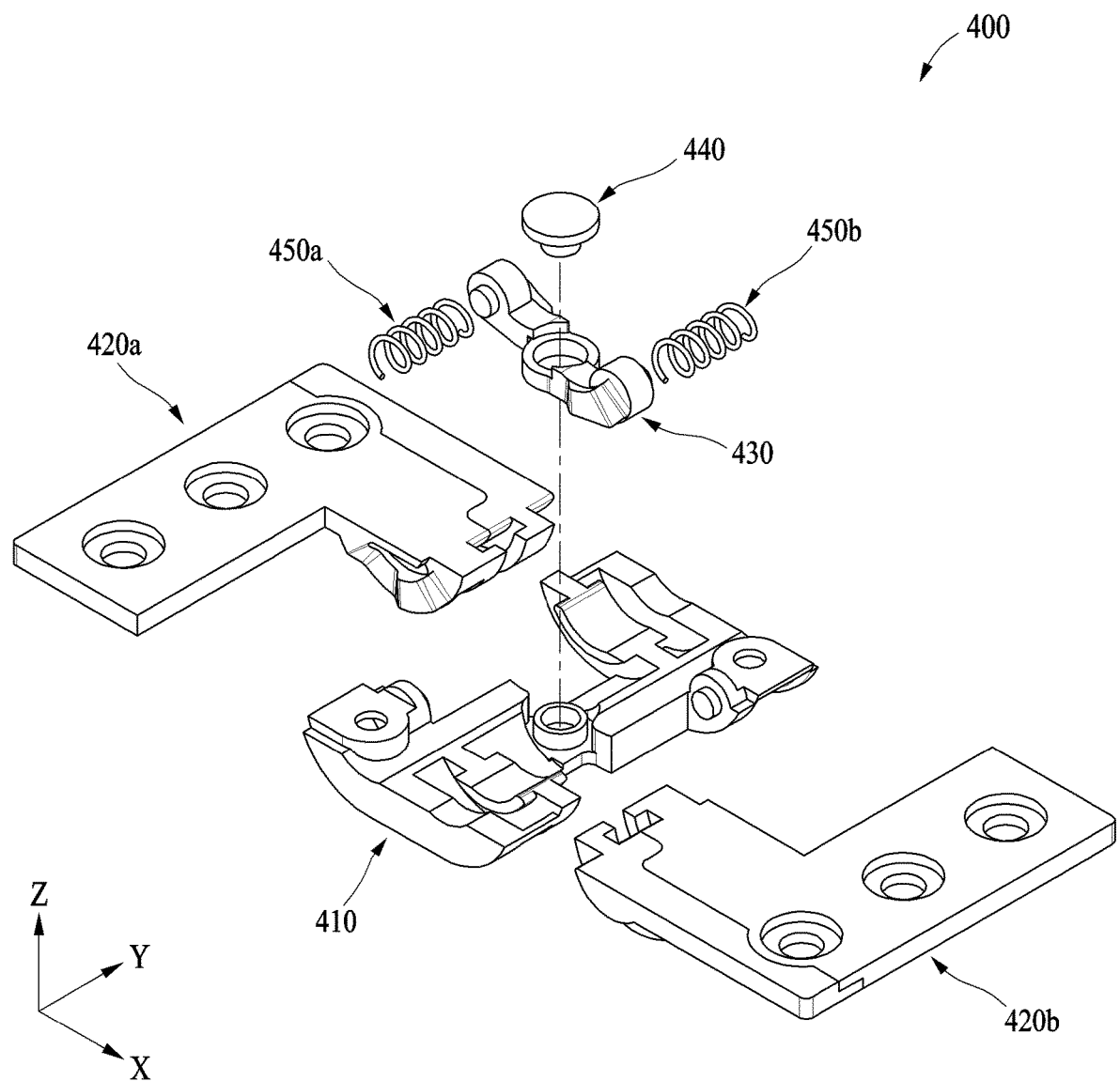
FIG. 4D is an exploded perspective view illustrating a hinge assembly according to an embodiment of the disclosure.
Figure 4E:
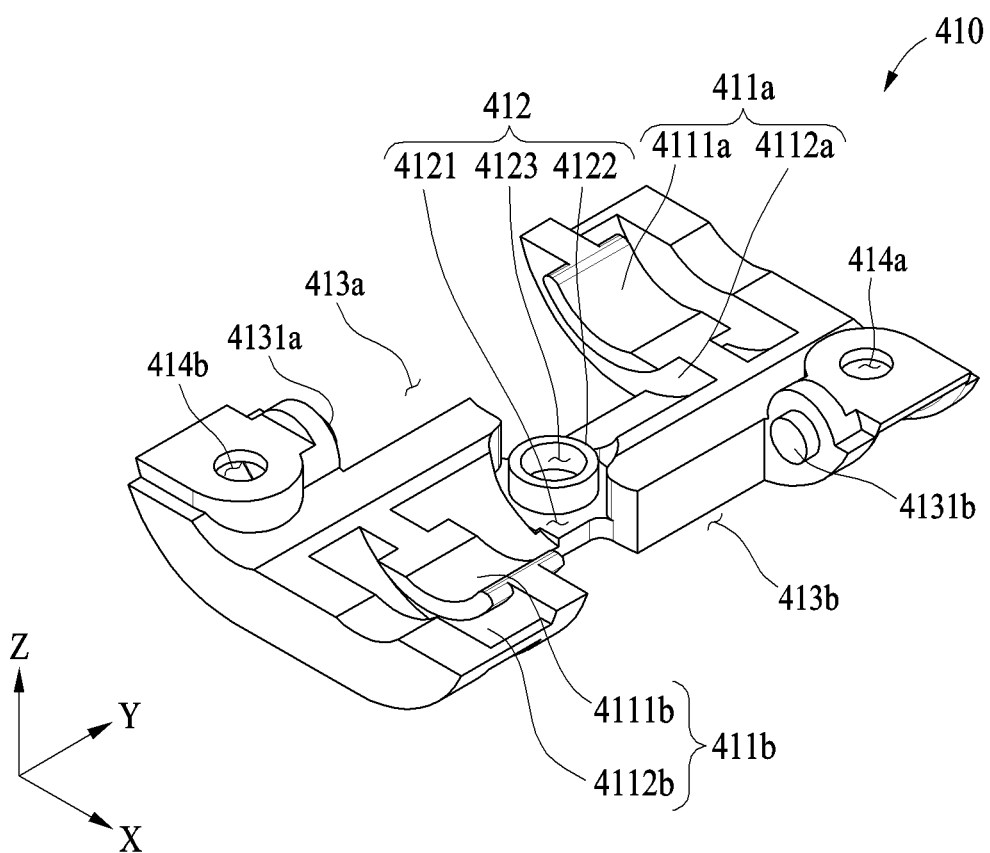
FIG. 4E is a perspective view illustrating a hinge bracket according to an embodiment of the disclosure.
Figure 4F:
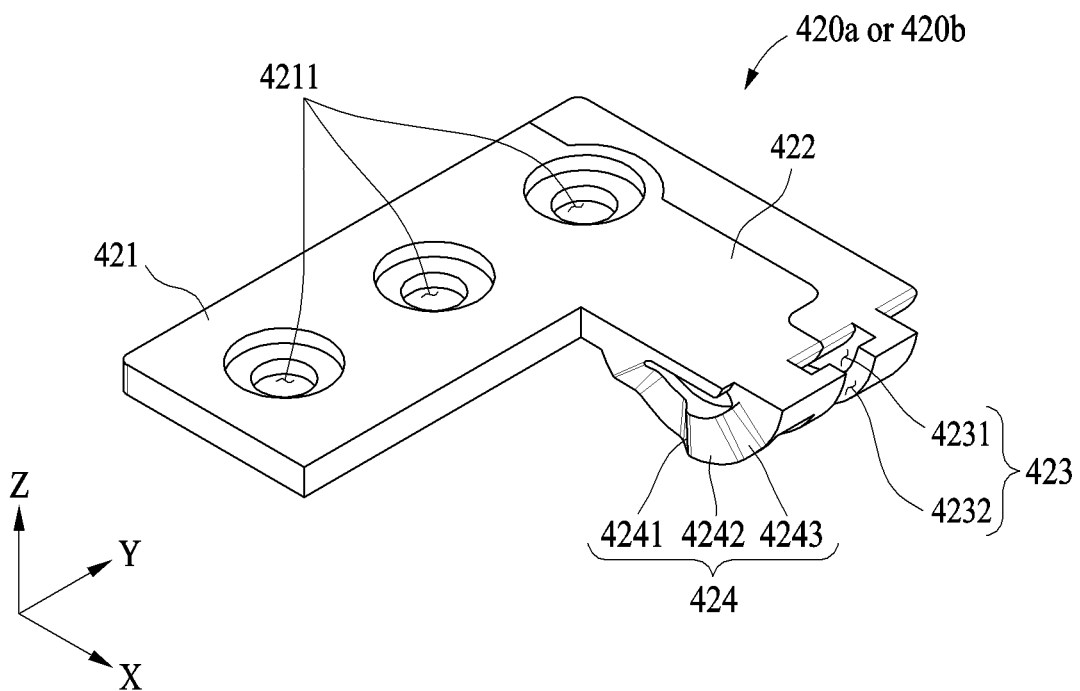
FIG. 4F is a perspective view illustrating a hinge structure according to an embodiment of the disclosure.
Figure 4G:
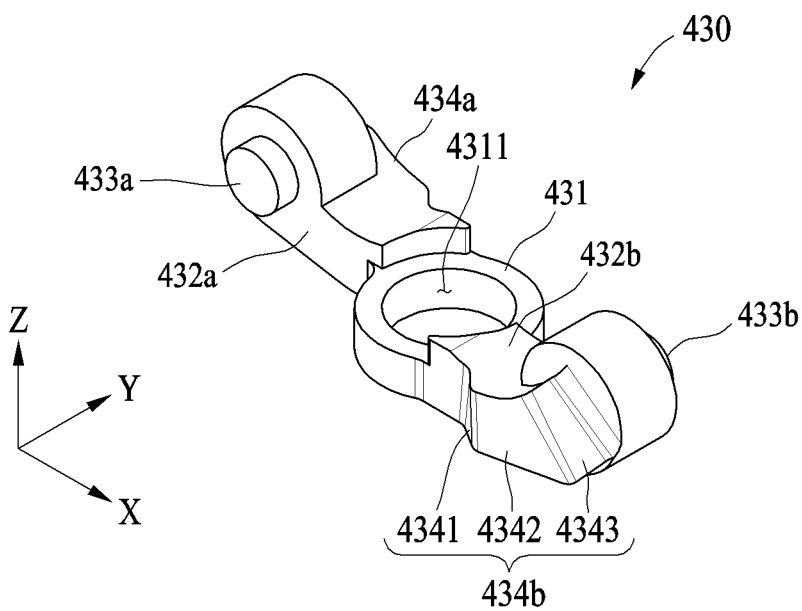
FIG. 4G is a perspective view illustrating an intermediate member according to an embodiment of the disclosure.

FIG. 4A is a perspective view illustrating an unfolded state of a hinge assembly according to an embodiment of the disclosure. FIG. 4B is a front view illustrating the unfolded state of the hinge assembly according to an embodiment of the disclosure. FIG. 4C is a rear view illustrating the unfolded state of the hinge assembly according to an embodiment of the disclosure. FIG. 4D is an exploded perspective view illustrating the hinge assembly according to an embodiment of the disclosure. FIG. 4E is a perspective view illustrating a hinge bracket according to an embodiment of the disclosure. FIG. 4F is a perspective view illustrating a hinge structure according to an embodiment of the disclosure. FIG. 4G is a perspective view illustrating an intermediate member according to an embodiment of the disclosure.

Referring to FIGS. 4A through 4G, a hinge assembly 400 according to an embodiment of the disclosure may include a hinge bracket 410, a pair of hinge structures 420a and 420b, an intermediate member 430, a pin member 440, and a pair of elastic members 450a and 450b.

The hinge bracket 410 according to an embodiment of the disclosure may be fixedly connected to a housing (e.g., the housing 310 of FIG. 3). For example, the hinge bracket 410 may be fixedly connected to a hinge housing (e.g., the hinge housing 313 of FIG. 3). At least a portion of a lower surface (e.g., a surface facing a −z-axis direction) of the hinge bracket 410 may include a curved surface. For example, the lower surface of the hinge bracket 410 may be formed to correspond to the shape of the inside of the hinge housing 313. At least a portion of an upper surface (e.g., a surface facing a +z-axis direction) of the hinge bracket 410 may have a flat surface.

In an embodiment of the disclosure, the hinge bracket 410 may include a pair of first rail structures 411a and 411b, an intermediate member connector 412, a pair of open spaces 413a and 413b, and a pair of bracket fixing holes 414a and 414b.

In an embodiment of the disclosure, the hinge bracket 410 may include the pair of first rail structures 411a and 411b so that the pair of hinge structures 420a and 420b may be rotatably coupled. At least a portion of a cross section of the pair of first rail structures 411a and 411b may have an arc shape in a direction from the upper surface (e.g., the surface facing the +z-axis direction) to the lower surface (e.g., the surface facing the −z-axis direction). The pair of first rail structures 411a and 411b may be formed to protrude in an arc shape with a predetermined angle. For example, spaces on both sides (e.g., a +y side and a −y side) of the first rail structure 411a or 411b may be relatively recessed such that a cross section of the first rail structure 411a or 411b facing an xz plane may protrude in an arc shape. The hinge structure 420a or 420b may be connected to the hinge bracket 410 in a direction (e.g., an +x-axis direction or an −x-axis direction) perpendicular to a folding axis (e.g., the folding axis A of FIG. 2A). For example, a second rail structure 423 formed in the hinge structure 420a or 420b may be inserted into the first rail structure 411a or 411b in the +x-axis direction or the −x-axis direction, so that the hinge structure 420a or 420b may be connected to the hinge bracket 410. The second rail structure 423 of each of the hinge structures 420a and 420b may be inserted into the pair of first rail structures 411a and 411b to interoperate with the pair of first rail structures 411a and 411b. The pair of first rail structures 411a and 411b may be formed to diagonally face each other. For example, the pair of first rail structures 411a and 411b may be formed to be point-symmetric with respect to the center of the hinge bracket 410, when the hinge bracket 410 is viewed from the front side. For example, one first rail structure 411a may be formed at a position relatively biased in the −x-axis direction and/or a +y-axis direction, in comparison to the other first rail structure 411b, and the other first rail structure 411b may be formed at a position relatively biased in the +x-axis direction and/or a −y-axis direction, in comparison to the one first rail structure 411a. The arc shapes of the pair of first rail structures 411a and 411b may define a pair of hinge axes Ha and Hb, respectively. For example, centers of the arc shapes of the pair of first rail structures 411a and 411b may be defined as a pair of the hinge axes Ha and Hb, respectively. The pair of hinge axes Ha and Hb may be parallel to the folding axis A. The pair of hinge axes Ha and Hb may be spaced apart from each other by a designated interval.

In an embodiment of the disclosure, the intermediate member connector 412 may be formed near the center of the hinge bracket 410. For example, the intermediate member connector 412 may be formed at the center of the hinge bracket 410, when the hinge bracket 410 is viewed from the front side. The intermediate member 430 that will be described below may be rotatably connected to the intermediate member connector 412.

In an embodiment of the disclosure, the intermediate member connector 412 may include an intermediate member arrangement space 4121, an intermediate protrusion 4122, and a pin insertion hole 4123.

In an embodiment of the disclosure, the intermediate member arrangement space 4121 may be formed at the center of the hinge bracket 410, when the hinge bracket 410 is viewed from the front side. For example, the intermediate member arrangement space 4121 may be recessed with a shape corresponding to a shape of an outer portion of a central portion 431 of the intermediate member 430. The intermediate protrusion 4122 may protrude from the intermediate member arrangement space 4121 in a direction perpendicular to the hinge axis Ha or Hb. For example, the intermediate protrusion 4122 may protrude in the +z-axis direction. The intermediate protrusion 4122 may have a cylindrical shape. An outer diameter of the intermediate protrusion 4122 may correspond to a diameter of a through-hole 4311 of the intermediate member 430. The pin insertion hole 4123 may be recessed at the intermediate protrusion 4122 in the direction perpendicular to the hinge axis Ha or Hb or may penetrate the intermediate protrusion 4122 in the direction perpendicular to the hinge axis Ha or Hb. For example, the pin insertion hole 4123 may penetrate the intermediate protrusion 4122 in the −z-axis direction, or may be recessed in the −z-axis direction. The direction of the intermediate protrusion 4122 and the pin insertion hole 4123 may define a middle axis M. The middle axis M may be positioned between the pair of hinge axes Ha and Hb and may be perpendicular to the pair of hinge axes Ha and Hb. For example, the middle axis M may be oriented in the z-axis direction. The pin member 440 that will be described below may be inserted into the pin insertion hole 4123. A diameter of the pin insertion hole 4123 may correspond to an outer diameter of the pin member 440.

In an embodiment of the disclosure, the pair of open spaces 413a and 413b may be formed on both sides (e.g., a −x side and a +x side based on FIG. 4E) of the hinge bracket 410. For example, when the hinge bracket 410 is viewed from the front side, if a direction parallel to the hinge axis Ha or Hb corresponds to the y-axis, the pair of open spaces 413a and 413b may be formed on both sides (e.g., the −x side and the +x side based on FIG. 4E) of the hinge bracket 410, respectively. The open space 413a, 413b may be a space for an arrangement of at least the elastic member 450a or 450b and/or an extension 432a or 432b of the intermediate member 430. For example, at least a portion of the open space 413a, 413b may be formed to have a longitudinal direction in the y-axis direction. The pair of open spaces 413a and 413b may be formed to diagonally face each other. For example, the pair of open spaces 413a and 413b may be formed to be point-symmetric with respect to the center of the hinge bracket 410 when the hinge bracket 410 is viewed from the front side.

In an embodiment of the disclosure, a first connection projection 4131a or 4131b may protrude in a direction parallel to the hinge axis Ha or Hb in the open space 413a or 413b. For example, one first connection projection 4131a may protrude in the +y-axis direction in one open space 413a, and the other first connection projection 4131b may protrude in the −y-axis direction in the other open space 413b. The first connection projection 4131a or 4131b may be inserted into and connected to one end portion (e.g., an end portion facing the −y-axis direction, or an end portion facing the +y-axis direction) of the elastic member 450a or 450b.

In an embodiment of the disclosure, the hinge bracket 410 may include the pair of bracket fixing holes 414a and 414b to fix the hinge bracket 410 to the hinge housing 313. For example, a fastening member (e.g., a screw, a bolt, a pin, and/or a counterpart structure) may be inserted into each of the pair of bracket fixing holes 414a and 414b. The pair of bracket fixing holes 414a and 414b may be formed to diagonally face each other. For example, the pair of bracket fixing holes 414a and 414b may be formed to be point-symmetric with respect to the center of the hinge bracket 410 when the hinge bracket 410 is viewed from the front side. For example, one bracket fixing hole 414a may be formed at a position relatively biased in the +x-axis direction and/or +y-axis direction, in comparison to the other bracket fixing hole 414b, and the other bracket fixing hole 414b may be formed at a position relatively biased in the −x-axis direction and/or the −y-axis direction, in comparison to the one bracket fixing hole 414a. For example, the pair of bracket fixing holes 414a and 414b may be disposed in a diagonal direction that crosses a direction in which the pair of first rail structures 411a and 411b are disposed.

In an embodiment of the disclosure, the pair of hinge structures 420a and 420b may be rotatably connected with respect to the hinge bracket 410. For example, the pair of hinge structures 420a and 420b may be rotatably connected to the pair of first rail structures 411a and 411b, respectively. The pair of hinge structures 420a and 420b may be disposed to diagonally face each other. For example, the pair of hinge structures 420a and 420b may be disposed to be point-symmetric with respect to the center of the hinge assembly 400, when the hinge assembly 400 is viewed from the front side.

In an embodiment of the disclosure, the hinge structure 420a or 420b may include a first body 421, a second body 422, the second rail structure 423, and a first cam structure 424.

In an embodiment of the disclosure, the first body 421 may have a plate shape. The first body 421 may be fixedly connected to the first housing (e.g., the first housing 311 of FIG. 3) or the second housing (e.g., the second housing 312 of FIG. 3). The first body 421 may be parallel to a front surface (e.g., a surface facing the +z-axis direction based on the state of FIG. 3) of the first housing 311 or the second housing 312. At least one housing fixing hole 4211 for fixing the hinge structure 420a or 420b to the first housing 311 or the second housing 312 may be formed in the first body 421. For example, the housing fixing hole 4211 may be formed to penetrate the first body 421 in the z-axis direction. For example, a fastening member (e.g., a screw, a bolt, a pin, and/or a counterpart structure) may be inserted into the housing fixing hole 4211. Although three housing fixing holes 4211 are formed as shown in FIG. 4F, this is merely an example, and a number of housing fixing holes 4211 is not limited thereto.

In an embodiment of the disclosure, the second body 422 may be formed to extend from at least a portion of one end of the first body 421. For example, referring to FIG. 4F, the second body 422 may be formed to extend in the +x-axis direction from at least a portion of an end of the first body 421 facing the +x-axis direction. The second body 422 may be formed integrally with the first body 421. At least a portion of a cross section of the second body 422 may have an arc shape in the direction from the upper surface (e.g., the surface facing the +z-axis direction) to the lower surface (e.g., the surface facing the −z-axis direction). For example, at least a portion of a cross section of the second body 422 facing the xz plane may have an arc shape.

In an embodiment of the disclosure, the second rail structure 423 may be formed on a lower side (e.g., a side facing the −z-axis direction) of the second body 422. The second rail structure 423 may be recessed in the second body 422. The second rail structure 423 may be recessed from a lower end portion (e.g., an end portion facing the −z-axis direction) of the second body 422 in an upward direction (e.g., the +z-axis direction) such that at least a portion of the lower end portion (e.g., the end portion facing the −z-axis direction) of the second body 422 may be opened. At least a portion of a cross section of the second rail structure 423 may have an arc shape in the direction from the upper surface (e.g., the surface facing the +z-axis direction) to the lower surface (e.g., the surface facing the −z-axis direction). For example, at least a portion of a cross section of the second rail structure 423 facing the xz plane may have an arc shape. The arc shape of the second rail structure 423 may correspond to the arc shape of the first rail structure 411a or 411b. The hinge structure 420a or 420b may be connected to the hinge bracket 410 such that the first rail structure 411a or 411b may be inserted into the second rail structure 423. The second rail structure 423 may rotate about the hinge axis Ha or Hb within a designated angle range along the first rail structure 411a or 411b. Based on the above structure, in a state in which the first rail structure 411a or 411b is inserted into the second rail structure 423, the hinge structure 420a or 420b may rotate about the hinge axis Ha or Hb within a designated angle range with respect to the hinge bracket 410. For example, the hinge structure 420a or 420b may rotate in the xz plane about the hinge axis Ha or Hb formed by the first rail structure 411a or 411b and the second rail structure 423. The first rail structure 411a or 411b and the second rail structure 423 may allow only a rotational motion of the hinge structure 420a or 420b on the xz plane and may restrict a translational motion and/or a rotational motion of the hinge structure 420a or 420b in another direction. For example, an inner portion 4111a or 4111b of the first rail structure 411a or 411b in the radial direction may be formed to be stepped with a relatively large width (e.g., a width in the y-axis direction), in comparison to an outer portion 4112a or 4112b, and an inner portion 4231 of the second rail structure 423 in the radial direction may be formed to be stepped with a relatively large width (e.g., a width in the y-axis direction), in comparison to an outer portion 4232. The pair of first rail structures 411a and 411b protrude and the second rail structure 423 is recessed, as illustrated and described above, however, this is merely an example. For example, the pair of first rail structures 411a and 411b may be recessed, and the second rail structure 423 may protrude.

In an embodiment of the disclosure, the first cam structure 424 may be formed on one surface of the second body 422. For example, based on FIG. 4F, the first cam structure 424 may be formed on a surface of the second body 422 facing the −y-axis direction. The first cam structure 424 may be formed along an arc having the hinge axis Ha or Hb as a center. For example, the first cam structure 424 may be formed along an arc shape of the lower side (e.g., the side facing the −z direction) of the second body 422. The first cam structure 424 may have at least one mountain and/or valley structure. For example, the first cam structure 424 may protrude to include a first inclined surface 4241, a first flat surface 4242, and a second inclined surface 4243.

In an embodiment of the disclosure, the intermediate member 430 may be disposed between the pair of hinge structures 420a and 420b. The intermediate member 430 may be connected to the hinge bracket 410 through the intermediate member connector 412. The intermediate member 430 may be disposed in the intermediate member arrangement space 4121 and may be rotatable with respect to the hinge bracket 410 about the middle axis M perpendicular to the pair of hinge axes Ha and Hb. A pair of second cam structures 434a and 434b interoperating with the first cam structure 424 may be formed on both end portions (e.g., an end portion facing the −x-axis direction and an end portion facing the +x-axis direction) of the intermediate member 430.

In an embodiment of the disclosure, the intermediate member 430 may include the central portion 431, a pair of extensions 432a and 432b, a pair of second connection projections 433a and 433b, and a pair of second cam structures 434a and 434b.

In an embodiment of the disclosure, the central portion 431 may be a portion positioned at the center of the intermediate member 430. The central portion 431 may have a centrally open shape. For example, the central portion 431 may have a cylindrical shape with an open center. The through-hole 4311 may be formed in the center of the central portion 431. For example, the through-hole 4311 may penetrate the central portion 431 in the z-axis direction. The central portion 431 may be disposed in the intermediate member arrangement space 4121 so that the intermediate protrusion 4122 of the hinge bracket 410 may be inserted into the through-hole 4311. The central portion 431 may be disposed in the intermediate member arrangement space 4121 to be rotatable with respect to the hinge bracket 410 about the middle axis M perpendicular to the pair of hinge axes Ha and Hb.

In an embodiment of the disclosure, the pair of extensions 432a and 432b may be portions extending to both sides (e.g., a side facing the −x direction and a side facing the +x direction) of the central portion 431. For example, one extension 432a may extend from the central portion 431 in the −x direction, and the other extension 432b may extend from the central portion 431 in the +x direction. The pair of extensions 432a and 432b may be formed to be point-symmetric with respect to the center, when the intermediate member 430 is viewed from the front side. For example, one extension 432a may be formed at a position relatively biased in the −x-axis direction and/or the +y-axis direction, in comparison to the other extension 432b, and the other extension 432b may be formed at a position relatively biased in the +x-axis direction and/or the −y-axis direction, in comparison to the one extension 432a. In a state in which the central portion 431 is disposed in the intermediate member arrangement space 4121, the pair of extensions 432a and 432b may be disposed in the pair of open spaces 413a and 413b, respectively.

In an embodiment of the disclosure, the second cam structure 434a or 434b may be formed on one surface (e.g., a surface facing the +y-axis or −y-axis direction) of the extension 432a or 432b, and the second connection projection 433a or 433b may be formed on another surface (e.g., a surface facing the −y-axis or +y-axis direction).

In an embodiment of the disclosure, the pair of second connection projections 433a and 433b may be formed to protrude from one surface of the pair of extensions 432a and 432b. The pair of second connection projections 433a and 433b may be formed to be point-symmetric with respect to the center, when the intermediate member 430 is viewed from the front side. For example, one second connection projection 433a may protrude from one surface (e.g., the surface facing the −y-axis direction) of one extension 432a, and the other second connection projection 433b may protrude from one surface (e.g., the surface facing the +y-axis direction) of the other extension 432b. The second connection projection 433a or 433b may be inserted into and connected to another end portion (e.g., the end portion facing the +y-axis direction, or the end portion facing the −y-axis direction) of the elastic member 450a or 450b.

In an embodiment of the disclosure, the pair of second cam structures 434a and 434b may protrude from the other surface of the pair of extensions 432a and 432b. The pair of second connection projections 433a and 433b may be formed to be point-symmetric with respect to the center, when the intermediate member 430 is viewed from the front side. The second cam structure 434a or 434b may be formed on a surface opposite to the second connection projection 433a or 433b. For example, one second cam structure 433a may be formed on another surface (e.g., the surface facing the +y-axis direction) of the one extension 432a, and the other second cam structure 434b may be formed on another surface (e.g., the surface facing the −y-axis direction) of the other extension 432b. The second cam structure 434a or 434b may be formed along an arc having the hinge axis Ha or Hb as a center. The second cam structure 434a or 434b may have at least one mountain and/or valley structure. For example, the second cam structure 434a or 434b may protrude to include a third inclined surface 4341, a second flat surface 4342, and a fourth inclined surface 4343.

In an embodiment of the disclosure, the pin member 440 may be inserted into the pin insertion hole 4123 in the z-axis direction in a state in which the intermediate member 430 is disposed in the intermediate member arrangement space 4121 of the hinge bracket 410. The pin member 440 may be disposed between the pair of hinge axes Ha and Hb in a direction of the middle axis M perpendicular to the pair of hinge axes Ha and Hb. Based on the above structure, the intermediate member 430 may be rotatable with respect to the hinge bracket 410 about the middle axis M formed by the intermediate protrusion 4122 and the pin member 440. The pin member 440 may prevent the intermediate member 430 from being separated from the hinge bracket 410 in the direction (e.g., the z-axis direction) of the middle axis M. For example, to prevent the intermediate member 430 from being separated from the hinge bracket 410 in the upward direction (e.g., the +z-axis direction) along the middle axis M, the pin member 440 may include a pin head having a diameter greater than that of the through-hole 4311.

In an embodiment of the disclosure, the elastic member 450a or 450b may generate an elastic force. For example, the elastic member 450a or 450b may generate an elastic force in the longitudinal direction. The elastic member 450a or 450b may be disposed in a direction parallel to the hinge axis Ha or Hb to generate an elastic force in the longitudinal direction. For example, the elastic member 450a or 450b may have a shape of a spring with an empty space inside. The elastic member 450a or 450b may be disposed in the open space 413a or 413b so that one end portion (e.g., the end portion facing the −y-axis direction or +y-axis direction) may be connected to the first connection projection 4131a or 4131b, and that another end portion (e.g., the end portion facing the +y-axis direction or −y-axis direction) may be connected to the second connection projection 433a or 433b. For example, the one end portion (e.g., the end portion facing the −y-axis direction or +y-axis direction) of the elastic member 450a or 450b may be supported by the hinge bracket 410, and the other end portion (e.g., the end portion facing the +y-axis direction or −y-axis direction) may be supported by the intermediate member 430. The elastic member 450a or 450b may provide an elastic force to the extension 432a or 432b in a direction in which the second cam structure 434a or 434b is pressed toward the first cam structure 424a or 424b. For example, one elastic member 450a may press the one extension 432a in the +y-axis direction, and the other elastic member 450b may press the other extension 432b in the −y-axis direction. As a result, the elastic force of the elastic member 450a or 450b may generate torque for rotating the intermediate member 430 in the direction in which the second cam structure 434a or 434b is pressed toward the first cam structure 424a or 424b. Based on the above structure, the second cam structure 434a or 434b and the first cam structure 424a or 424b may be in close contact with each other. In an embodiment of the disclosure, the elastic member may also be formed of a torsion spring for generating an elastic force in a rotation direction. For example, the elastic member may be inserted into the intermediate protrusion 4122 to generate an elastic force for rotating the intermediate member 430 in one direction (e.g., a clockwise direction).

Figure 4H:
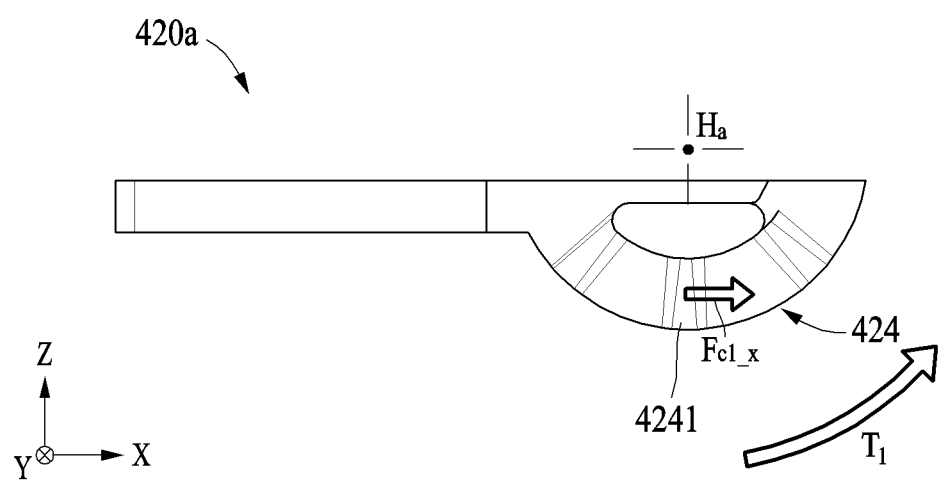
FIG. 4H illustrates a force and torque acting on one hinge structure of FIGS. 4A through 4C according to an embodiment of the disclosure.

FIG. 4H illustrates a force and torque acting on one hinge structure of FIGS. 4A through 4C according to an embodiment of the disclosure.

Referring to FIG. 4H, hereinafter, the force and torque acting on one hinge structure 420a in the unfolded state of the hinge assembly 400 according to an embodiment of the disclosure will be described with reference to FIGS. 4A through 4C and 4H. However, this is merely for convenience of description, and it will be obvious that the other hinge structure 420b may also operate in a manner corresponding to that of the one hinge structure 420a. The unfolded state of the hinge assembly 400 may refer to a state in which the pair of hinge structures 420a and 420b are fully unfolded with respect to the hinge bracket 410.

In an embodiment of the disclosure, in a state in which the hinge assembly 400 is unfolded, the first cam structure 424 and the second cam structure 434a may be alternately engaged with each other. For example, a mountain portion of the second cam structure 434a may be inserted into a valley portion of the first cam structure 424. For example, the first inclined surface 4241 of the first cam structure 424 and the third inclined surface 4341 of the second cam structure 434a may contact each other. The elastic member 450a may provide an elastic force Fs1 to the extension 432a of the intermediate member 430 in a direction in which the second cam structure 434a is pressed toward the first cam structure 424. For example, the elastic force Fs1 provided by the elastic member 450a may be applied in the +y-axis direction. If the elastic member 450a applies the elastic force Fs1 in the +y-axis direction in a state in which the mountain portion of the second cam structure 434a is inserted into the valley portion of the first cam structure 424, the intermediate member 430 may be in a state of being rotated by a predetermined angle about the middle axis M in a direction in which the extension 432a approaches the hinge structure 420a. For example, when the hinge assembly 400 is viewed from the front side, the intermediate member 430 may be in a state of being rotated in the clockwise direction by a predetermined angle about the middle axis M.

In an embodiment of the disclosure, the elastic force Fs1 of the elastic member 450a may be applied to press the second cam structure 434a to the first cam structure 424 in the +y-axis direction. The first cam structure 424 and the second cam structure 434a may apply a reaction force to each other in a direction perpendicular to inclined surfaces (e.g., the first inclined surface 4241 and the third inclined surface 4341) that are in contact with each other. For example, a reaction force Fc1 may be applied to the first cam structure 424 by the second cam structure 434a in a direction perpendicular to the first inclined surface 4241 and the third inclined surface 4341. For example, the reaction force Fc1 may be applied to the first cam structure 424 by the second cam structure 434a in a direction between the +x-axis direction and the +y-axis direction. FIG. 4H illustrates an x-axis direction component Fc1_$x$ of the reaction force Fc1 applied to the first inclined surface 4241 of the first cam structure 424 according to an embodiment of the disclosure.

Referring to FIG. 4H, the x-axis direction component Fc1_$x$ of the reaction force Fc1 may generate counterclockwise torque T1 about the hinge axis Ha. The counterclockwise torque T1 may be torque in a direction to allow the hinge structure 420a to be further unfolded with respect to the hinge bracket 410. Based on the above structure, in a state in which the hinge structure 420a is unfolded, the elastic force Fs1 of the elastic member 450a may act as torque to further unfold the hinge structure 420a. For example, in the state in which the hinge structure 420a is unfolded, the elastic force Fs1 of the elastic member 450a may act as a kind of an open detent force to allow the hinge structure 420a to be maintained in the unfolded state. Therefore, the hinge structure 420a may start to be folded with respect to the hinge bracket 410 only when a force greater than the open detent force is applied. If the force greater than the open detent force is not applied, the unfolded state of the hinge structure 420a with respect to the bracket 410 may be maintained.

Figure 4I:
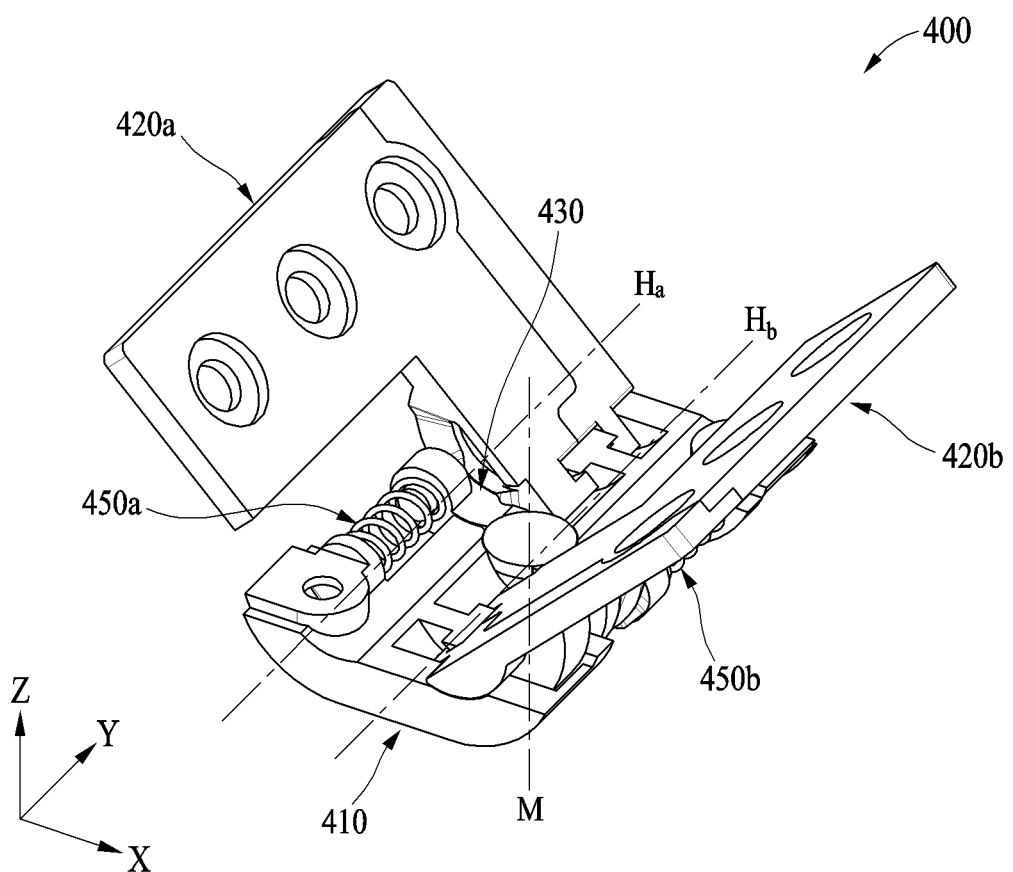
FIG. 4I is a perspective view illustrating an intermediate state of a hinge assembly according to an embodiment of the disclosure.
Figure 4J:
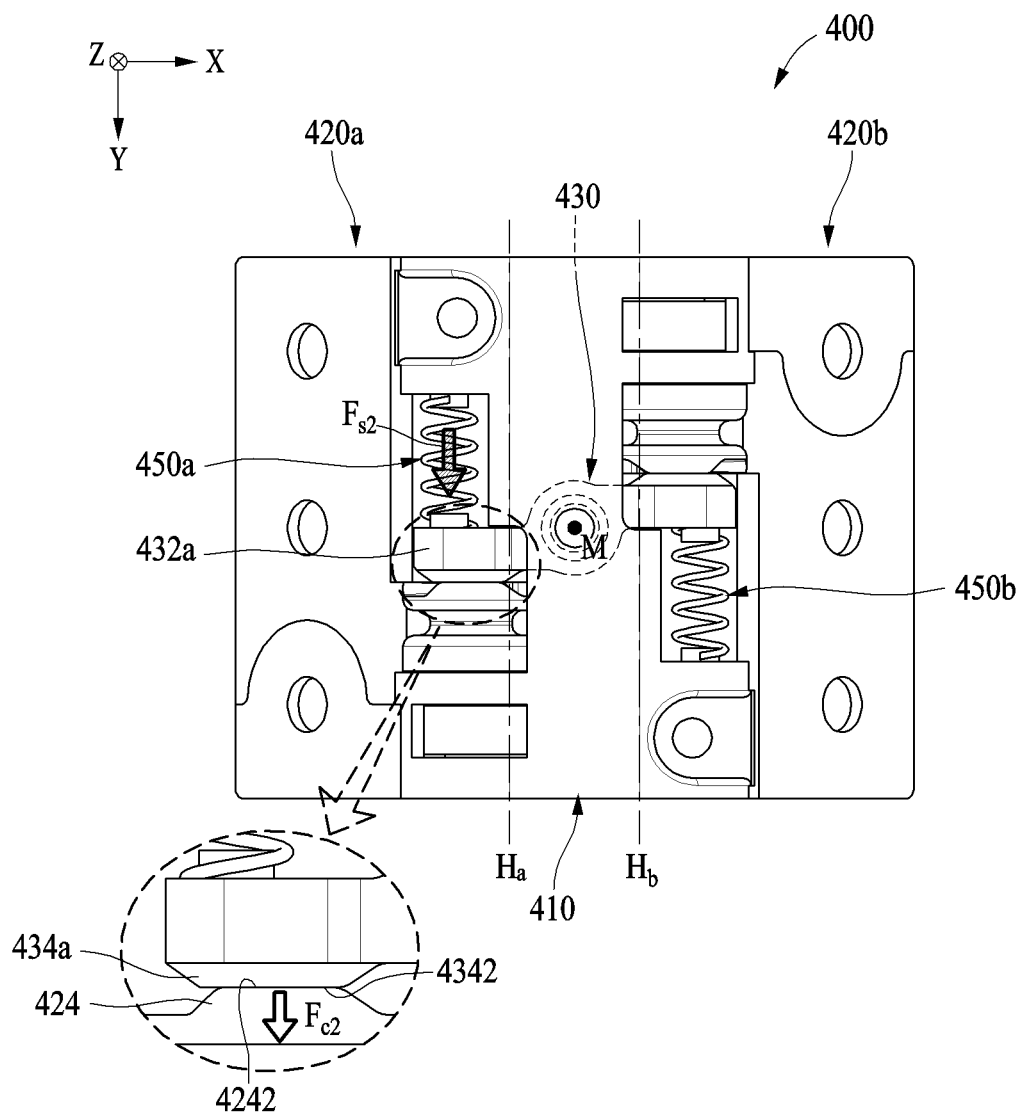
FIG. 4J is a rear view illustrating an intermediate state of a hinge assembly according to an embodiment of the disclosure.
Figure 4K:
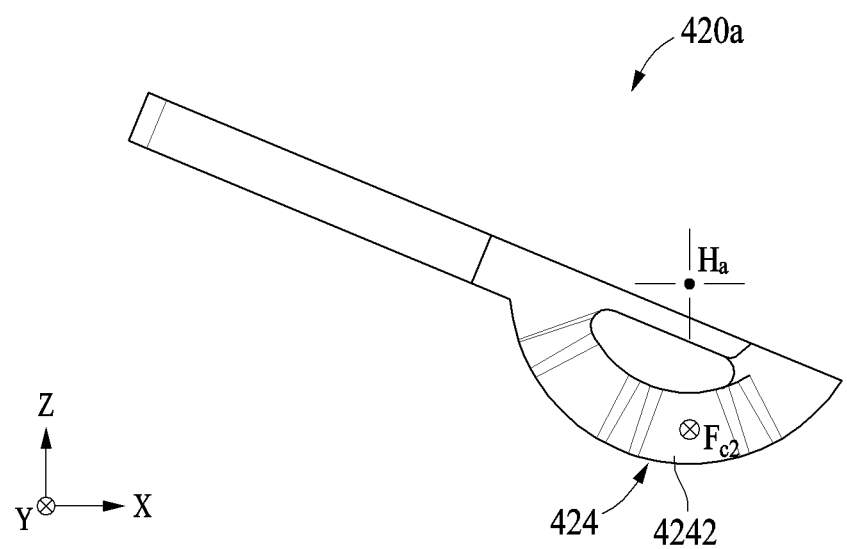
FIG. 4K illustrates a force acting on one hinge structure of FIGS. 4I and 4J according to an embodiment of the disclosure.

FIG. 4I is a perspective view illustrating an intermediate state of a hinge assembly according to an embodiment of the disclosure. FIG. 4J is a rear view illustrating an intermediate state of a hinge assembly according to an embodiment of the disclosure. FIG. 4K illustrates a force acting on one hinge structure of FIGS. 4I and 4J according to an embodiment of the disclosure.

Figure 4L:
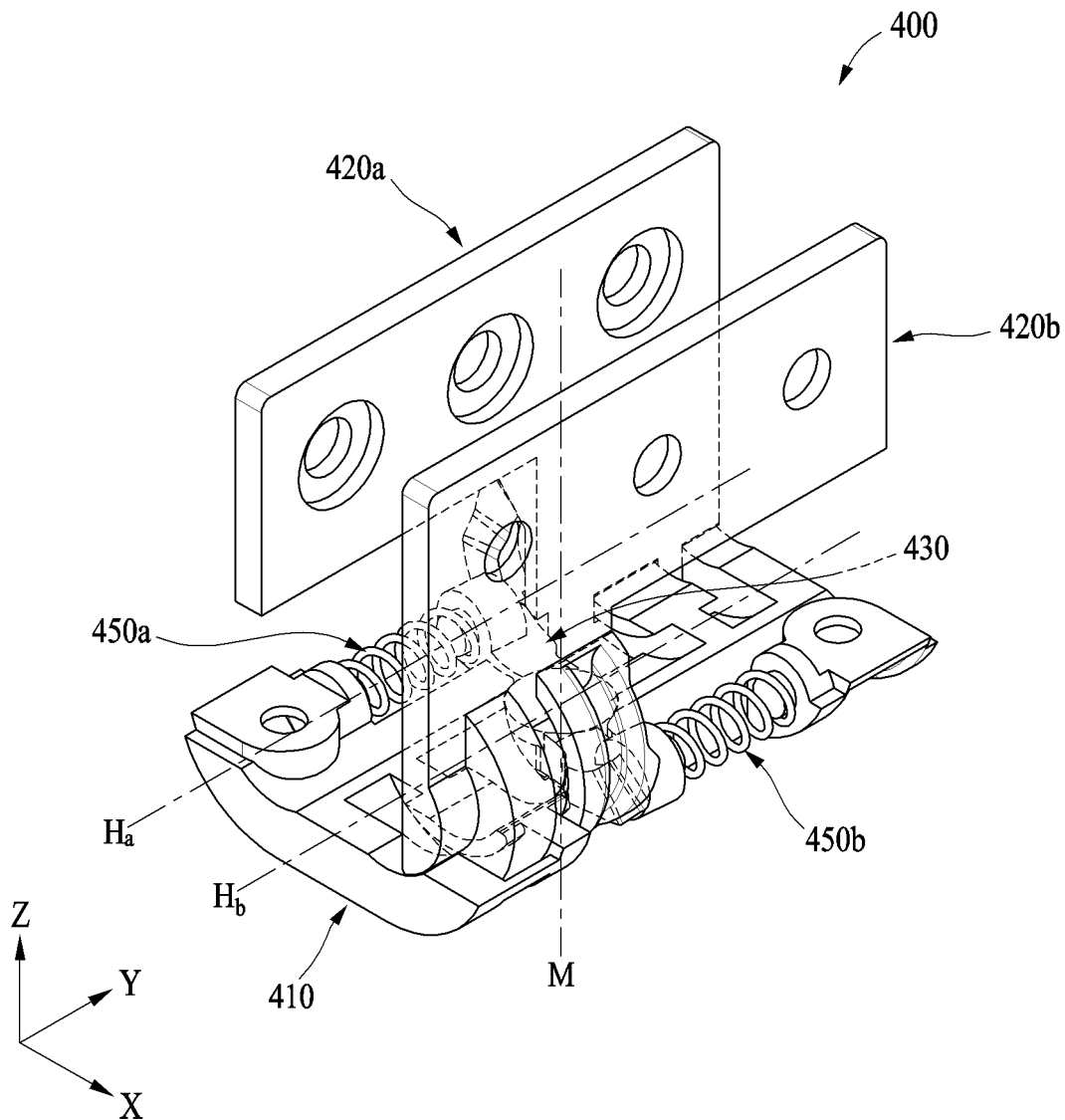
FIG. 4L is a perspective view illustrating a folded state of a hinge assembly according to an embodiment of the disclosure.

Referring to FIG. 4I, 4K, 4L, hereinafter, a force acting on one hinge structure 420a in an intermediate state of the hinge assembly 400 according to an embodiment of the disclosure will be described with reference to FIGS. 4I through 4K. However, this is merely for convenience of description, and it will be obvious that the other hinge structure 420b may also operate in a manner corresponding to that of the one hinge structure 420a. The intermediate state of the hinge assembly 400, which is a state between the unfolded state and the folded state, may refer to a state in which the pair of hinge structures 420a and 420b are rotated by a designated angle range about the hinge axes Ha and Hb with respect to the hinge bracket 410.

In an embodiment of the disclosure, in the intermediate state of the hinge assembly 400, a flat surface of the first cam structure 424 and a flat surface of the second cam structure 434a may contact each other. For example, the mountain portion of the first cam structure 424 and the mountain portion of the second cam structure 434a may contact each other. For example, the first flat surface 4242 of the first cam structure 424 and the second flat surface 4342 of the second cam structure 434a may contact each other. The elastic member 450a may provide an elastic force Fs2 to the extension 432a of the intermediate member 430 in the direction in which the second cam structure 434a is pressed toward the first cam structure 424. For example, the elastic force Fs2 provided by the elastic member 450a may be applied in the +y-axis direction. In a process in which one hinge structure 420a unfolded with respect to the hinge bracket 410 is rotated to be in the intermediate state, flat surfaces of the first cam structure 424 and the second cam structure 434a that are alternately arranged may be in face-to-face contact with each other. Accordingly, the intermediate member 430 may be rotated by a predetermined angle about the middle axis M in a direction in which the extension 432a moves away from the hinge structure 420a. For example, the extension 432a or 432b of the intermediate member 430 may be disposed parallel to the x-axis direction, when the hinge assembly 400 is viewed from the front side.

In an embodiment of the disclosure, the elastic force Fs2 of the elastic member 450a may be applied to press the second cam structure 434a to the first cam structure 424 in the +y-axis direction. The first cam structure 424 and the second cam structure 434a may apply a reaction force to each other in a direction perpendicular to flat surfaces (e.g., the first flat surface 4242 and the second flat surface 4342) that are in contact with each other. For example, a reaction force Fc2 may be applied to the first cam structure 424 by the second cam structure 434a in a direction perpendicular to the first flat surface 4242 and the second flat surface 4342. For example, the reaction force Fc2 may be applied to the first cam structure 424 by the second cam structure 434a in the +y-axis direction. FIG. 4K illustrates the reaction force Fc2 applied to the second flat surface 4242 of the first cam structure 424. Referring to FIG. 4K, since the reaction force Fc2 does not include an x-axis direction component or z-axis direction component, any torque about the hinge axis Ha may not be generated. Instead, the reaction force Fc2 may act as a normal force that generates a friction force between the first flat surface 4242 and the second flat surface 4342. Accordingly, due to the reaction force Fc2 acting perpendicular to the first flat surface 4242 and the second flat surface 4342, a large friction force may be generated between the first flat surface 4242 and the second flat surface 4342. Based on the above structure, in the intermediate state of the hinge structure 420a, the elastic force Fs2 of the elastic member 450a may generate a friction force that prevents the hinge structure 420a from being unfolded or folded. For example, in the intermediate state of the hinge structure 420a, the elastic force Fs2 of the elastic member 450a may act as an intermediate state stopping force to maintain the hinge structure 420a in the intermediate state. Therefore, the hinge structure 420a may start to be folded or unfolded with respect to the hinge bracket 410 only when a force greater than the intermediate state stopping force is applied. If the force greater than the intermediate state stopping force is not applied, the intermediate state of the hinge structure 420a with respect to the hinge bracket 410 may be maintained.

Figure 4M:
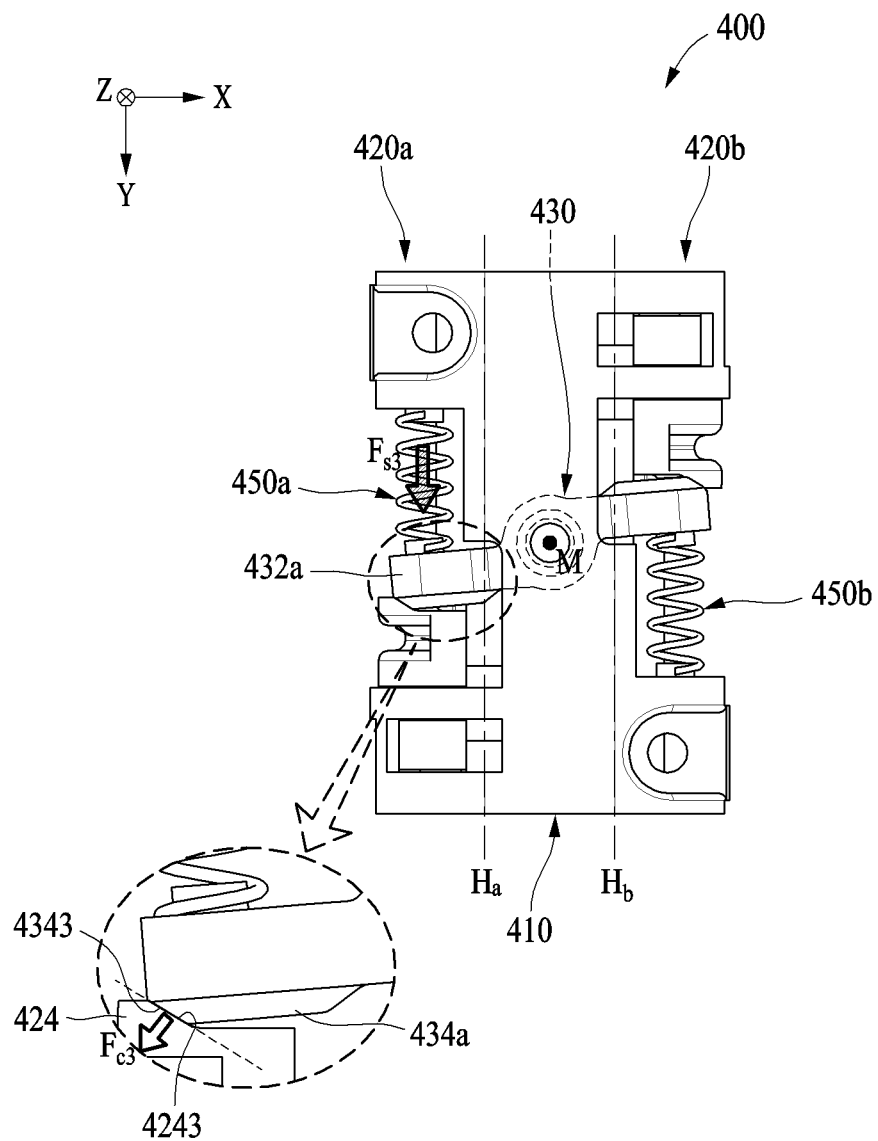
FIG. 4M is a rear view illustrating a folded state of a hinge assembly according to an embodiment of the disclosure.
Figure 4N:
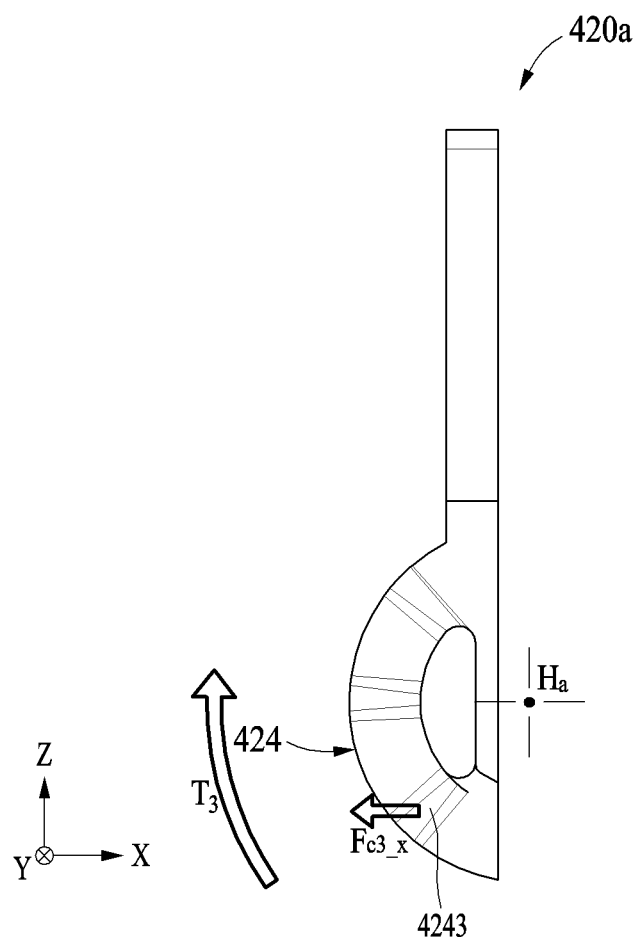
FIG. 4N illustrates a force and torque acting on one hinge structure of FIGS. 4L and 4M according to an embodiment of the disclosure.

FIG. 4L is a perspective view illustrating a folded state of a hinge assembly according to an embodiment of the disclosure. FIG. 4M is a rear view illustrating a folded state of a hinge assembly according to an embodiment of the disclosure. FIG. 4N illustrates a force and torque acting on one hinge structure of FIGS. 4L and 4M.

Referring to FIG. 4L, 4M, 4N, hereinafter, a force and torque acting on the hinge structure 420a in the state in which the hinge assembly 400 according to an embodiment of the disclosure is folded will be described with reference to FIGS. 4L through 4N. However, this is merely for convenience of description, and it will be obvious that the other hinge structure 420b may also operate in a manner corresponding to that of the one hinge structure 420a. The folded state of the hinge assembly 400 may refer to a state in which the pair of hinge structures 420a and 420b are fully folded with respect to the hinge bracket 410.

In an embodiment of the disclosure, in the state in which the hinge assembly 400 is folded, the first cam structure 424 and the second cam structure 434a may be alternately engaged with each other. For example, a mountain portion of the second cam structure 434a may be inserted into a valley portion of the first cam structure 424. For example, the third inclined surface 4243 of the first cam structure 424 and the fourth inclined surface 4343 of the second cam structure 434a may contact each other. The elastic member 450a may provide an elastic force Fs3 to the extension 432a of the intermediate member 430 in the direction in which the second cam structure 434a is pressed toward the first cam structure 424. For example, the elastic force Fs3 provided by the elastic member 450a may be applied in the +y-axis direction. In a process in which one hinge structure 420a in the intermediate state is rotated to be folded with respect to the hinge bracket 410, the first cam structure 424 and the second cam structure 434a that have the flat surfaces in face-to-face contact with each other may be alternately arranged. Here, if the elastic member 450a applies the elastic force Fs3 in the +y-axis direction, the intermediate member 430 may be rotated by a predetermined angle about the middle axis M in a direction in which the extension 432a approaches the hinge structure 420a. For example, when the hinge assembly 400 is viewed from the front side, the intermediate member 430 may be in a state of being rotated in the clockwise direction by a predetermined angle about the middle axis M.

In an embodiment of the disclosure, the elastic force Fs3 of the elastic member 450a may be applied to press the second cam structure 434a to the first cam structure 424 in the +y-axis direction. The first cam structure 424 and the second cam structure 434a may apply a reaction force to each other in a direction perpendicular to inclined surfaces (e.g., the third inclined surface 4243 and the fourth inclined surface 4343) that are in contact with each other. For example, the reaction force Fc3 may be applied to the first cam structure 424 by the second cam structure 434a in a direction perpendicular to the third inclined surface 4243 and the fourth inclined surface 4343. For example, the reaction force Fc3 may be applied to the first cam structure 424 by the second cam structure 434a in a direction between the −x-axis direction and the +y-axis direction. FIG. 4N illustrates an x-axis direction component Fc3_x of the reaction force Fc3 applied to the second inclined surface 4243 of the first cam structure 424. Referring to FIG. 4N, the x-axis direction component Fc3_x of the reaction force Fc3 may generate clockwise torque T3 about the hinge axis Ha. The clockwise torque T3 may be torque in a direction to allow the hinge structure 420a to be further folded with respect to the hinge bracket 410. Based on the above structure, in a state in which the hinge structure 420a is folded, the elastic force Fs3 of the elastic member 450a may act as torque to allow the hinge structure 420a to be further folded. For example, in the state in which the hinge structure 420a is folded, the elastic force Fs3 of the elastic member 450a may act as a kind of close detent force for maintaining the hinge structure 420a in the folded state. Accordingly, the hinge structure 420a may start to be unfolded with respect to the hinge bracket 410 only when a force greater than the close detent force is applied. If the force greater than the close detent force is not applied, the hinge structure 420a may be maintained in the folded state with respect to the bracket 410.

Figure 4O:
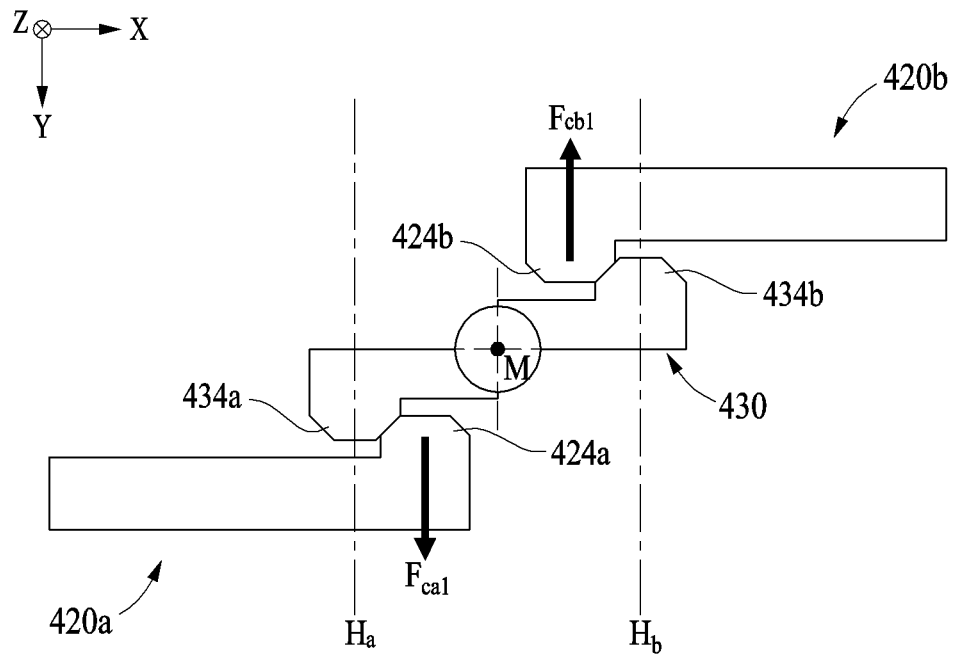
FIGS. 4O, 4P, and 4Q are rear views schematically illustrating a hinge assembly according to various embodiments of the disclosure.
Figure 4P:
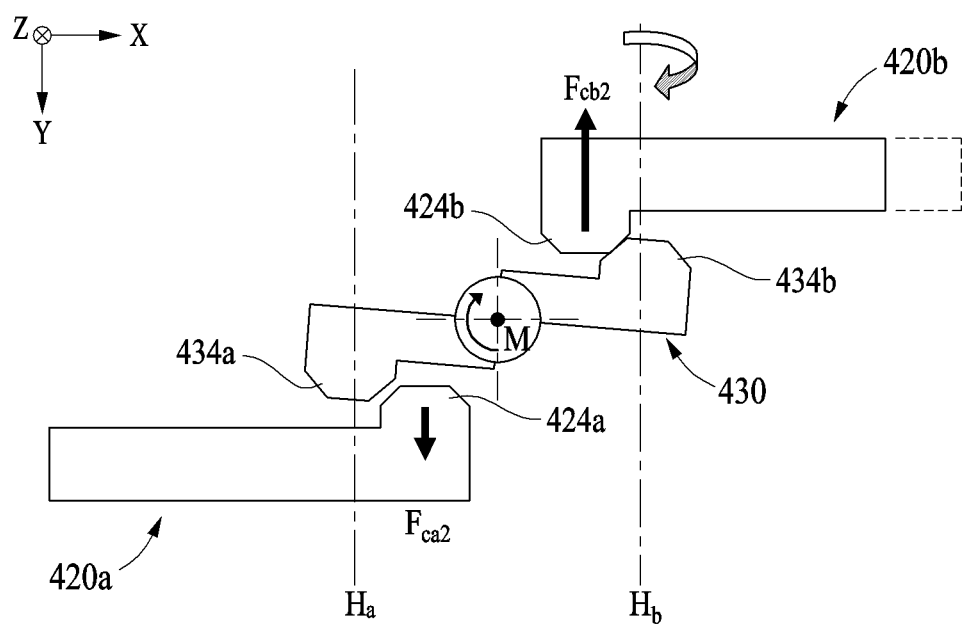
Figure 4Q:
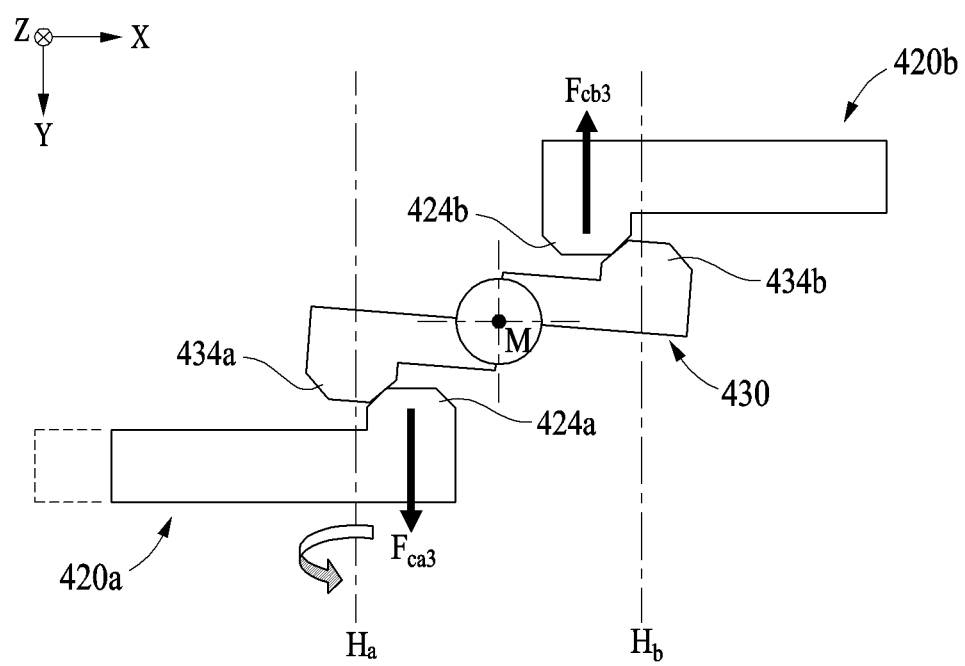

FIGS. 4O through 4Q are rear views schematically illustrating a hinge assembly according to various embodiments of the disclosure, and illustrate a process in which both sides are balanced in a situation in which one rotation member starts to rotate first.

FIG. 4O illustrates a state in which the pair of hinge structures 420a and 420b are rotated by the same angle. In the state of FIG. 4O, a reaction force Fca1 acting between the first cam structure 424a and the second cam structure 434a, and a reaction force Fcb1 acting between the first cam structure 424b and the second cam structure 434b on both sides may be equal to each other, to be balanced. FIG. 4P illustrates a state in which one hinge structure 420b first starts to rotate about the hinge axis Hb. A rotation angle of the one hinge structure 420b may be synchronized with a rotation angle of the other hinge structure 420a by a sync assembly (e.g., the sync assembly 320 of FIG. 3). However, a gap may be generated between components of the sync assembly 320 in a manufacturing process. Due to the gap, the rotation angle of the one hinge structure 420b and the rotation angle of the other hinge structure 420a may not be temporarily the same. In such a state, as shown in FIG. 4P, the first cam structure 424b of the one hinge structure 420b that starts to rotate first may start to push the second cam structure 434b, so that the intermediate member 430 may be rotated about the middle axis M in one direction (e.g., a clockwise direction). If the intermediate member 430 is rotated in one direction (e.g., clockwise) about the middle axis M, a distance between the first cam structure 424a and the second cam structure 434a of the other hinge structure 420a may relatively increase. Therefore, a reaction force Fca2 between the first cam structure 424a and the second cam structure 434a in the other hinge structure 420a may be relatively reduced in comparison to a reaction force Fcb2 between the first cam structure 424b and the second cam structure 434b in the one hinge structure 420b that starts to rotate first. For example, the reaction force Fca2 between the first cam structure 424a and the second cam structure 434a and the reaction force Fcb2 between the first cam structure 424b and the second cam structure 434b on both sides may be temporarily imbalanced. FIG. 4Q illustrates a state in which the other hinge structure 420a is rotated about the hinge axis Ha, to solve an imbalance between reaction forces. When the reaction force Fca2 between the first cam structure 424a and the second cam structure 434a and the reaction force Fcb2 between the first cam structure 424b and the second cam structure 434b are imbalanced, the other hinge structure 420a may be rotated about the hinge axis Ha until reaction forces Fca3 and Fcb3 on both sides are balanced, because a rotation resistance of the other hinge structure 420a having a relatively small reaction force Fca2 is less than that of the one hinge structure 420b having a relatively large reaction force Fcb2. As a result, the other hinge structure 420a may be rotated about the hinge axis Ha until the same angle as the rotation angle of the one hinge structure 420b is formed. In such a state, the reaction forces Fca3 and Fcb3 may be balanced with each other as shown in FIG. 4Q. As a result, since the pair of hinge structures 420a and 420b interoperate with each other through the intermediate member 430 in the hinge assembly 400 according to an embodiment of the disclosure, the other hinge structure 420a may be compensatingly rotated via the intermediate member 430 even though the one hinge structure 420b starts to rotate first. Therefore, the hinge assembly 400 according to an embodiment of the disclosure may complement the sync assembly 320 by reducing a rotation angle imbalance of the pair of hinge structures 420a and 420b by itself, and as a result, the pair of hinge structures 420a and 420b may be smoothly rotated.

Figure 4R:
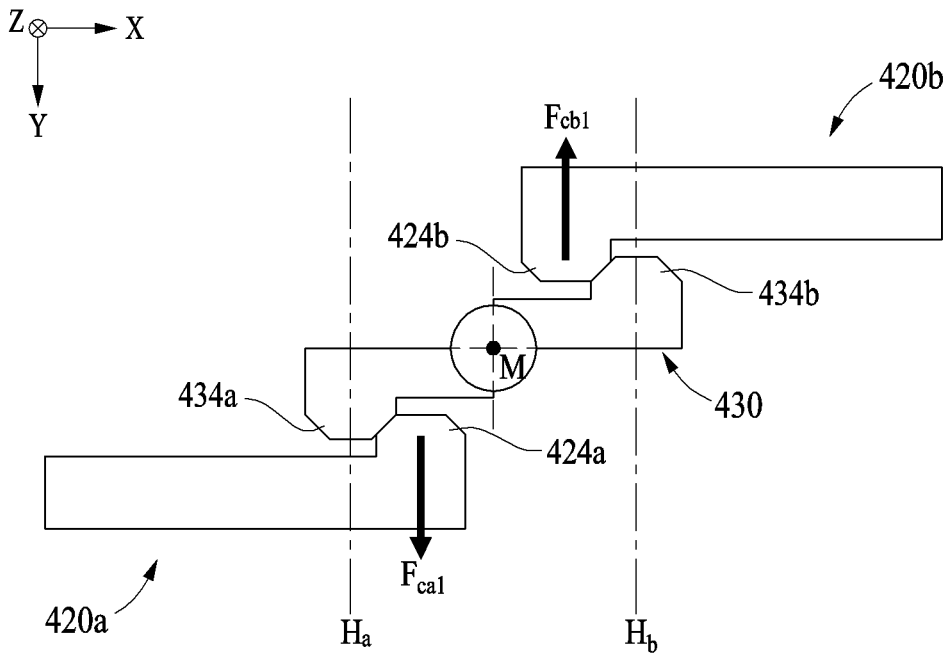
FIGS. 4R, 4S, and 4T are rear views schematically illustrating a hinge assembly according to various embodiments of the disclosure.
Figure 4S:
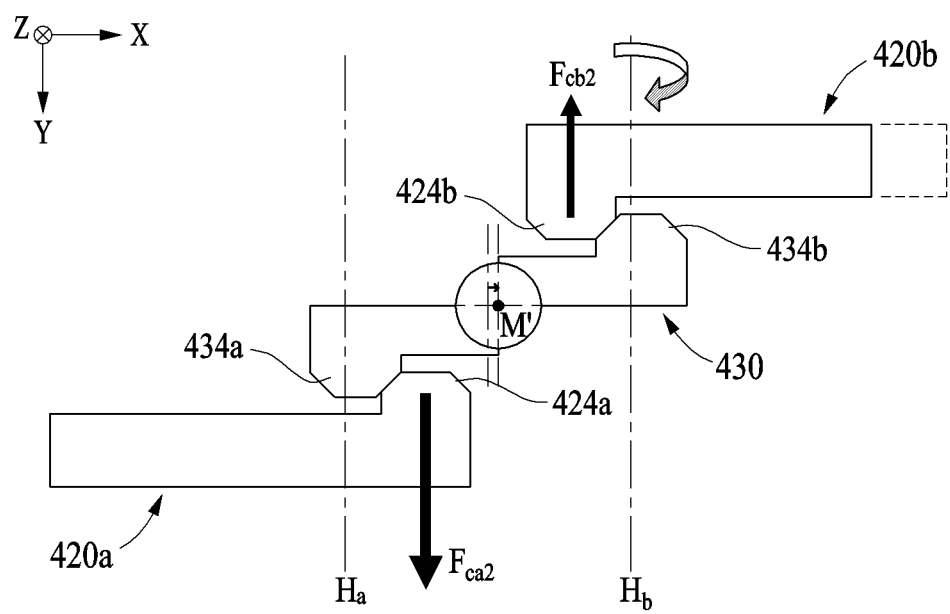
Figure 4T:
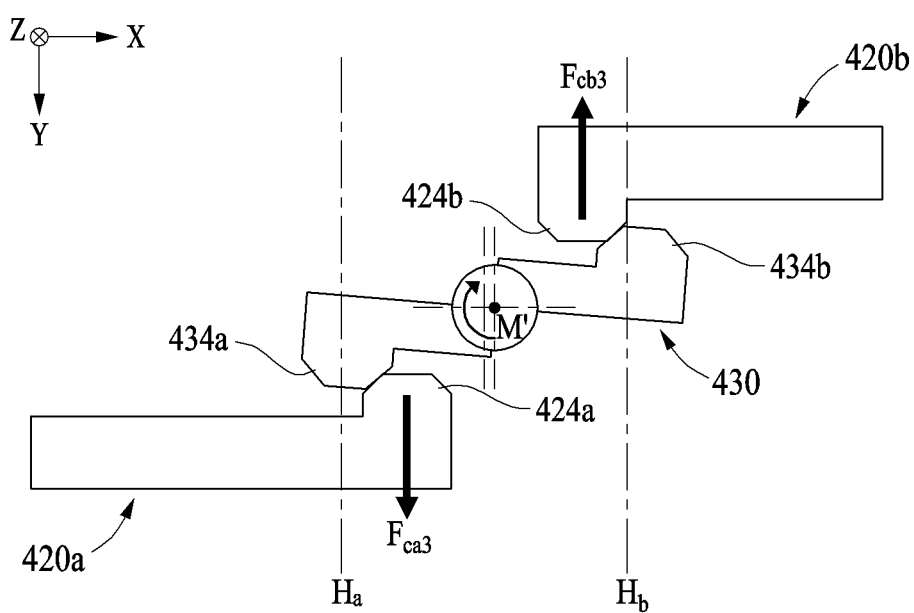

FIGS. 4R through 4T are rear views schematically illustrating a hinge assembly according to various embodiments of the disclosure, and illustrate a process in which both sides are balanced in a situation in which one rotation member starts to rotate first.

FIG. 4R illustrates a state in which the pair of hinge structures 420a and 420b are rotated by the same angle. In the state of FIG. 4R, a reaction force Fca1 acting between the first cam structure 424a and the second cam structure 434a, and a reaction force Fcb1 acting between the first cam structure 424b and the second cam structure 434b on both sides may be equal to each other, to be balanced. FIG. 4S illustrates a state in which one hinge structure 420b first starts to rotate about the hinge axis Hb. In a process in which the first cam structure 424b of the one hinge structure 420b that starts to rotate first pushes the second cam structure 434b, the intermediate member 430 may be pushed in one direction (e.g., the +x direction) by a gap between a throughhole (e.g., the through-hole 4311 of FIG. 4G) of the intermediate member 430 and an intermediate protrusion (e.g., the intermediate protrusion 4122 of FIG. 4E) of a hinge bracket (e.g., the hinge bracket 410 of FIG. 4E). In such a state, since the first cam structure 424a and the second cam structure 434a in the other hinge structure 420a interfere with each other, the reaction force Fca2 between the first cam structure 424a and the second cam structure 434a in the other hinge structure 420a may relatively increase in comparison to the reaction force Fcb2 between the first cam structure 424b and the second cam structure 434b in the one hinge structure 420b. For example, the reaction force Fca2 between the first cam structure 424a and the second cam structure 434a and the reaction force Fcb2 between the first cam structure 424b and the second cam structure 434b on both sides may be temporarily imbalanced. FIG. 4T illustrates a state in which the intermediate member 430 is rotated about a new middle axis M' in one direction (e.g., a clockwise direction), to solve an imbalance between reaction forces. In order to solve the interference between the first cam structure 424a and the second cam structure 434a in the other hinge structure 420a, the intermediate member 430 may be rotated about the new middle axis M' in the clockwise direction until the reaction force Fca3 between the first cam structure 424a and the second cam structure 434a and the reaction force Fcb3 between the first cam structure 424b and the second cam structure 434b on both sides are equal. In such a state, the reaction forces Fca3 and Fcb3 may be balanced with each other as shown in FIG. 4T. As a result, since the pair of hinge structures 420a and 420b interoperate with each other through the intermediate member 430 in the hinge assembly 400 according to an embodiment of the disclosure, the reaction forces Fca3 and Fcb3 on both sides may be balanced even though the one hinge structure 420b starts to rotate first. Therefore, the hinge assembly 400 according to an embodiment of the disclosure may prevent a reaction force imbalance of the pair of hinge structures 420a and 420b, and as a result, the pair of hinge structures 420a and 420b may be smoothly rotated.

In an embodiment of the disclosure, as described above with reference to FIGS. 4A through 4T, the intermediate member 430 may be rotated about the middle axis M between the pair of hinge structures 420a and 420b, and accordingly rotation operations of the hinge structure 420a or 420b may interoperate with each other through the intermediate member 430. Thus, the hinge assembly 400 may be smoothly folded or unfolded. In addition, by preventing tilting caused by a gap between components, the thickness of the hinge assembly 400 and the number of components of the hinge assembly 400 may be reduced, and a sufficient elastic force of the elastic member 450a or 450b may be secured.

Figure 5:
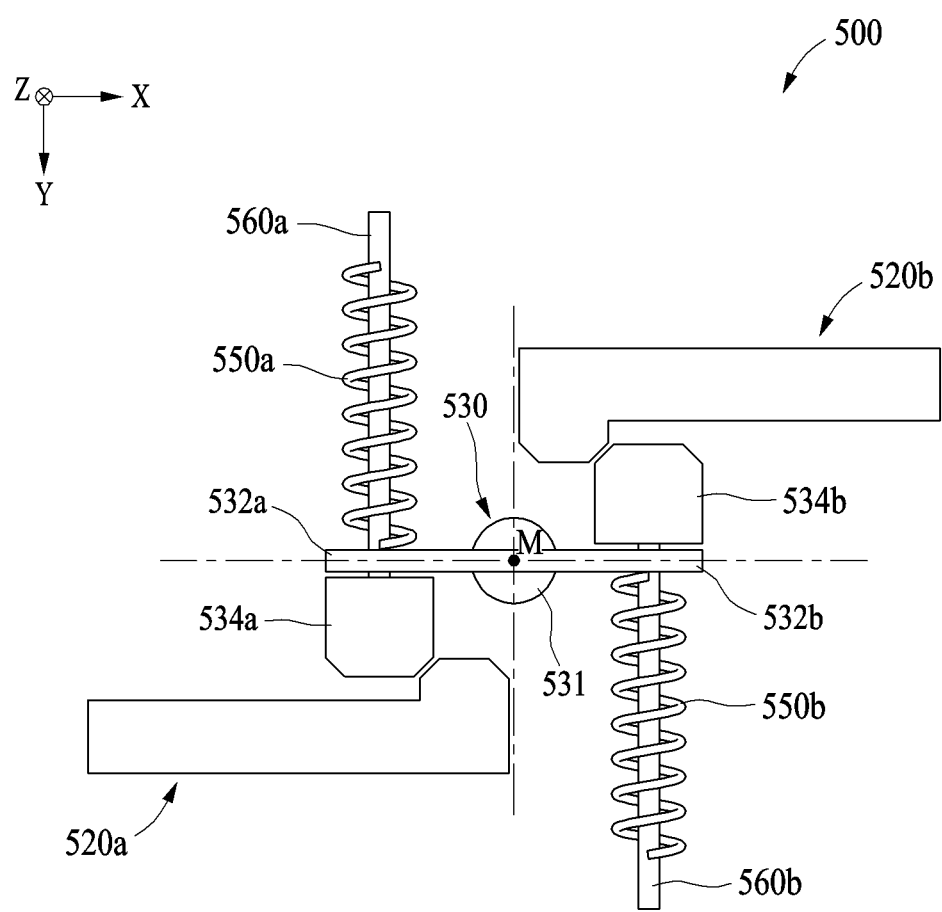
FIG. 5 is a rear view schematically illustrating a hinge assembly according to an embodiment of the disclosure.

FIG. 5 is a rear view schematically illustrating a hinge assembly according to an embodiment of the disclosure.

Referring to FIG. 5, in an embodiment of the disclosure, a pair of second cam structures 534a and 534b may be formed as separate components from an intermediate member 530. For example, at least a central portion 531 and a pair of extensions 532a and 532b of the intermediate member 530 may be integrally formed, and the pair of second cam structures 534a and 534b may be separate components in contact with the pair of extensions 532a and 532b. An elastic member 550a or 550b may press the extension 532a or 532b toward the second cam structure 534a or 534b such that the extension 532a or 532b may remain in contact with the second cam structure 534a or 534b. In addition, for a longitudinal alignment of the elastic member 550a or 550b, the extension 532a or 532b, and the second cam structure 534a or 534b, a guide member 560a or 560b penetrating the elastic member 550a or 550b, the extension 532a or 532b, and the second cam structure 534a or 534b in a longitudinal direction (e.g., a y-axis direction) may be separately provided. A hinge assembly 500 of FIG. 5 may operate in substantially the same manner as the hinge assembly 400 described with reference to FIGS. 4A through 4T.

Figure 6:
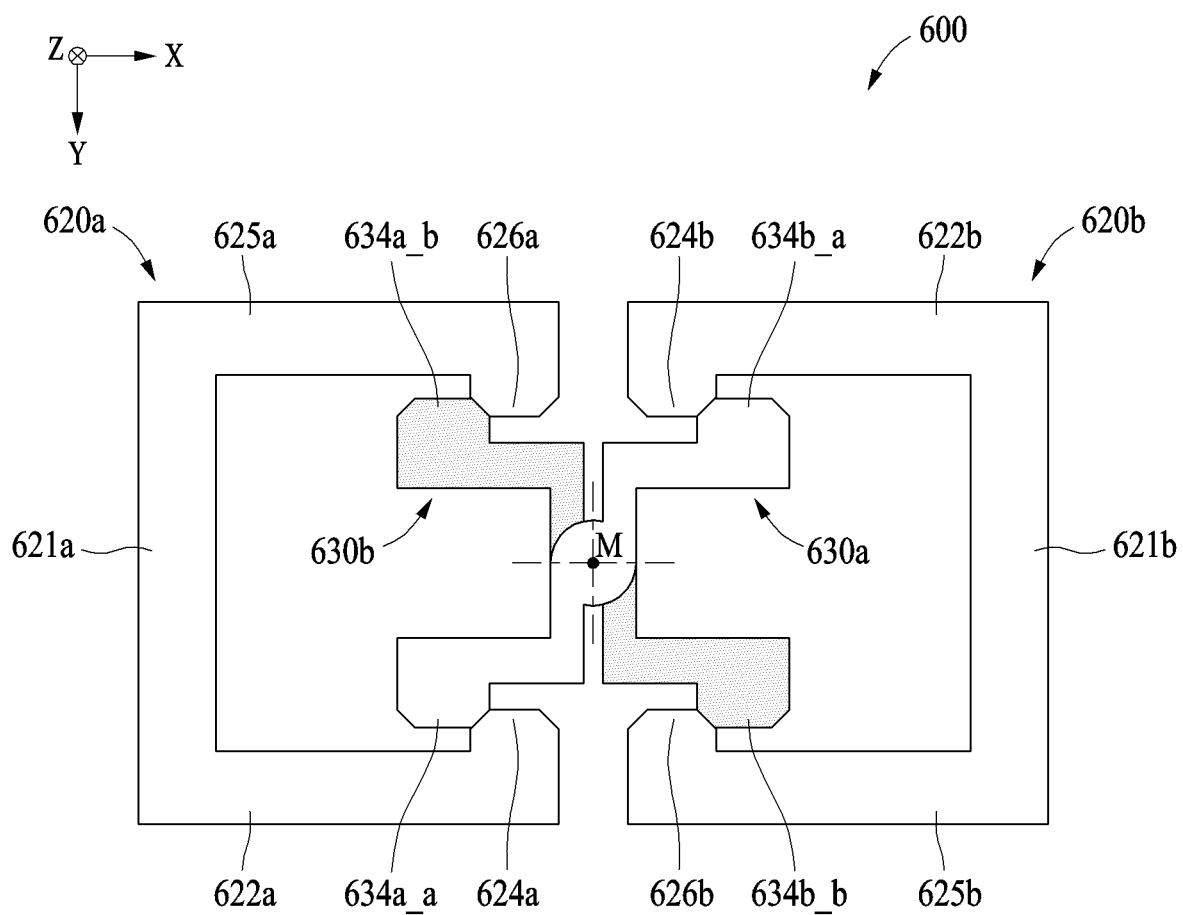
FIG. 6 is a rear view schematically illustrating a hinge assembly according to an embodiment of the disclosure.

FIG. 6 is a rear view schematically illustrating a hinge assembly according to an embodiment of the disclosure.

Referring to FIG. 6, in an embodiment of the disclosure, hinge structures 620a and 620b may be formed to be symmetrical with each other about an x-axis. For example, the hinge structure 620a or 620b may include a first body 621a or 621b, a second body 622a or 622b extending from one side (e.g., a side facing a −y-axis direction or +y-axis direction) of the first body 621a or 621b, and a third body 625a or 625b extending from another side (e.g., a side facing the +y-axis direction or −y-axis direction) of the first body 621a or 621b. A first cam structure 624a or 624b may be formed in the second body 622a or 622b, and a third cam structure 626a or 626b may be formed in the third body 625a or 625b.

In an embodiment of the disclosure, a pair of intermediate members 630 may be provided. For example, the intermediate members 630 may include a first intermediate member 630a and a second intermediate member 630b. The first intermediate member 630a and the second intermediate member 630b may be disposed to cross each other. For example, the first intermediate member 630a and the second intermediate member 630b may share the same middle axis M, but may be respectively disposed in diagonal directions crossing each other. For example, the first cam structure 624a of one hinge structure 620a may interoperate with one second cam structure 634a a of the first intermediate member 630a, and the third cam structure 626a of the one hinge structure 620a may interoperate with one second cam structure 634a_b of the second intermediate member 630b. The first cam structure 624b of the other hinge structure 620b may interoperate with another second cam structure 634b_a of the first intermediate member 630a, and the third cam structure 626b of the other hinge structure 620b may interoperate with another second cam structure 634b_b of the second intermediate member 630b. A hinge assembly 600 of FIG. 6 may operate in substantially the same manner as the hinge assembly 400 described with reference to FIGS. 4A through 4T. The hinge assembly 600 of FIG. 6 may generate a detent force greater than that of the hinge assembly 400 of FIGS. 4A through 4T.

Figure 7A:
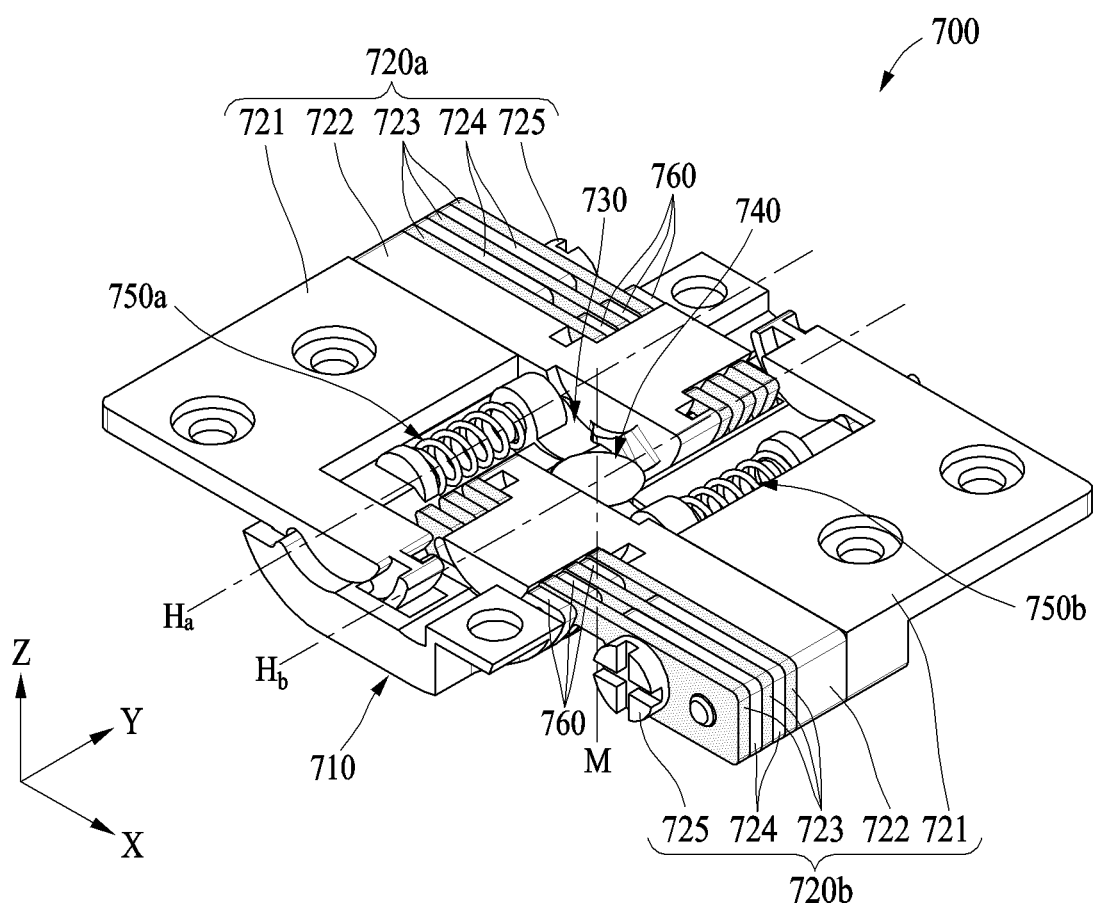
FIG. 7A is a perspective view illustrating an unfolded state of a hinge assembly according to an embodiment of the disclosure.
Figure 7B:
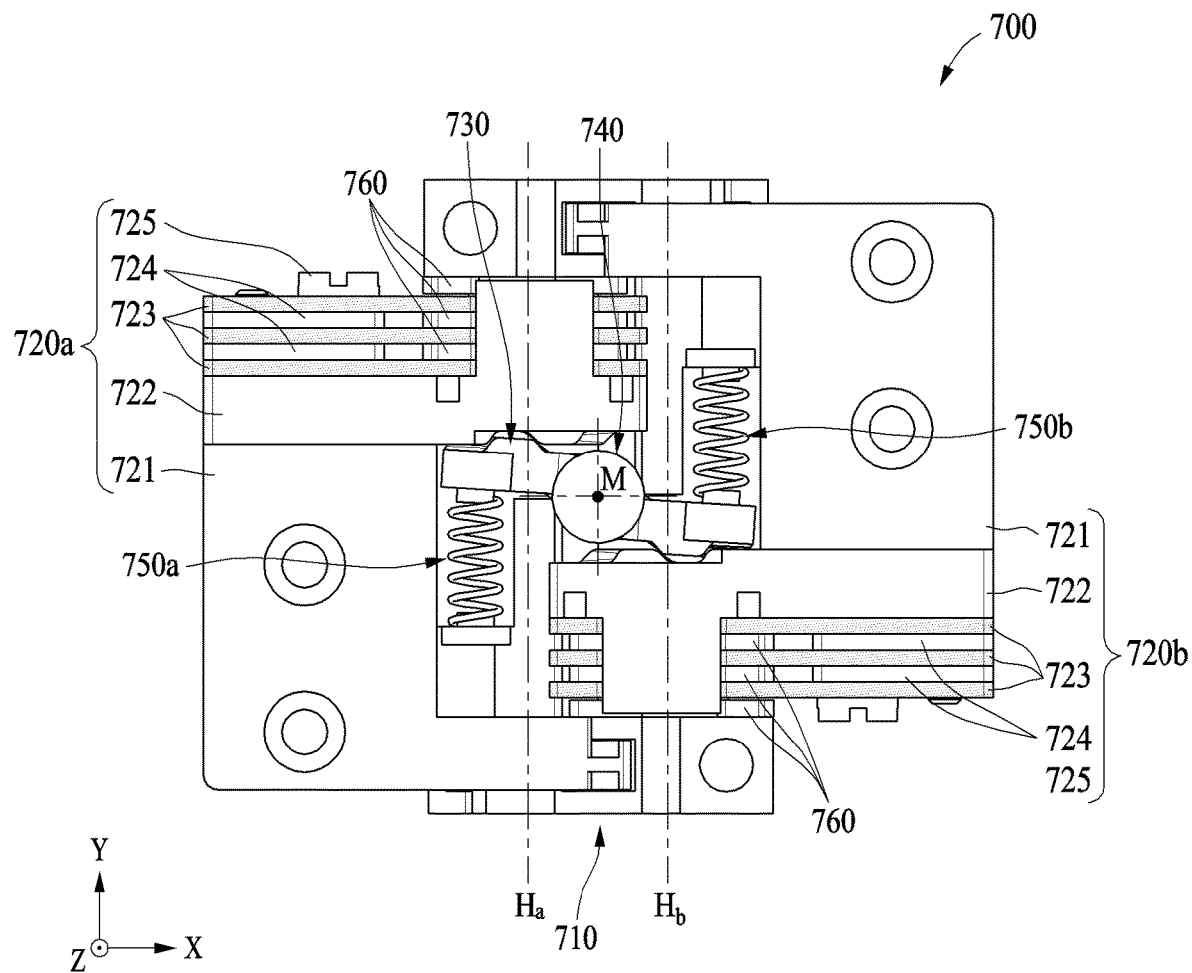
FIG. 7B is a front view illustrating an unfolded state of a hinge assembly according to an embodiment of the disclosure.
Figure 7C:
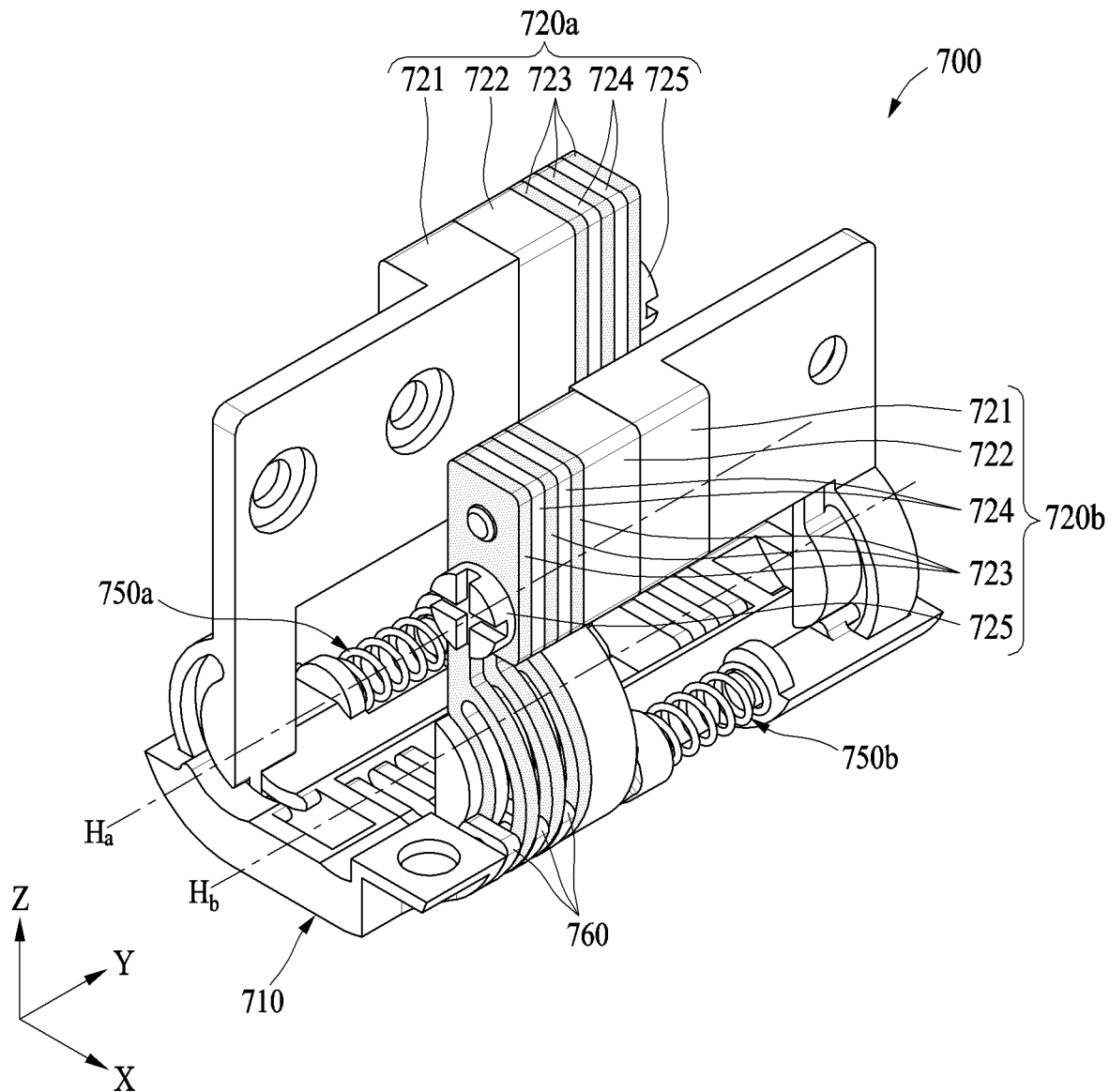
FIG. 7C is a perspective view illustrating a folded state of a hinge assembly according to an embodiment of the disclosure.
Figure 7D:
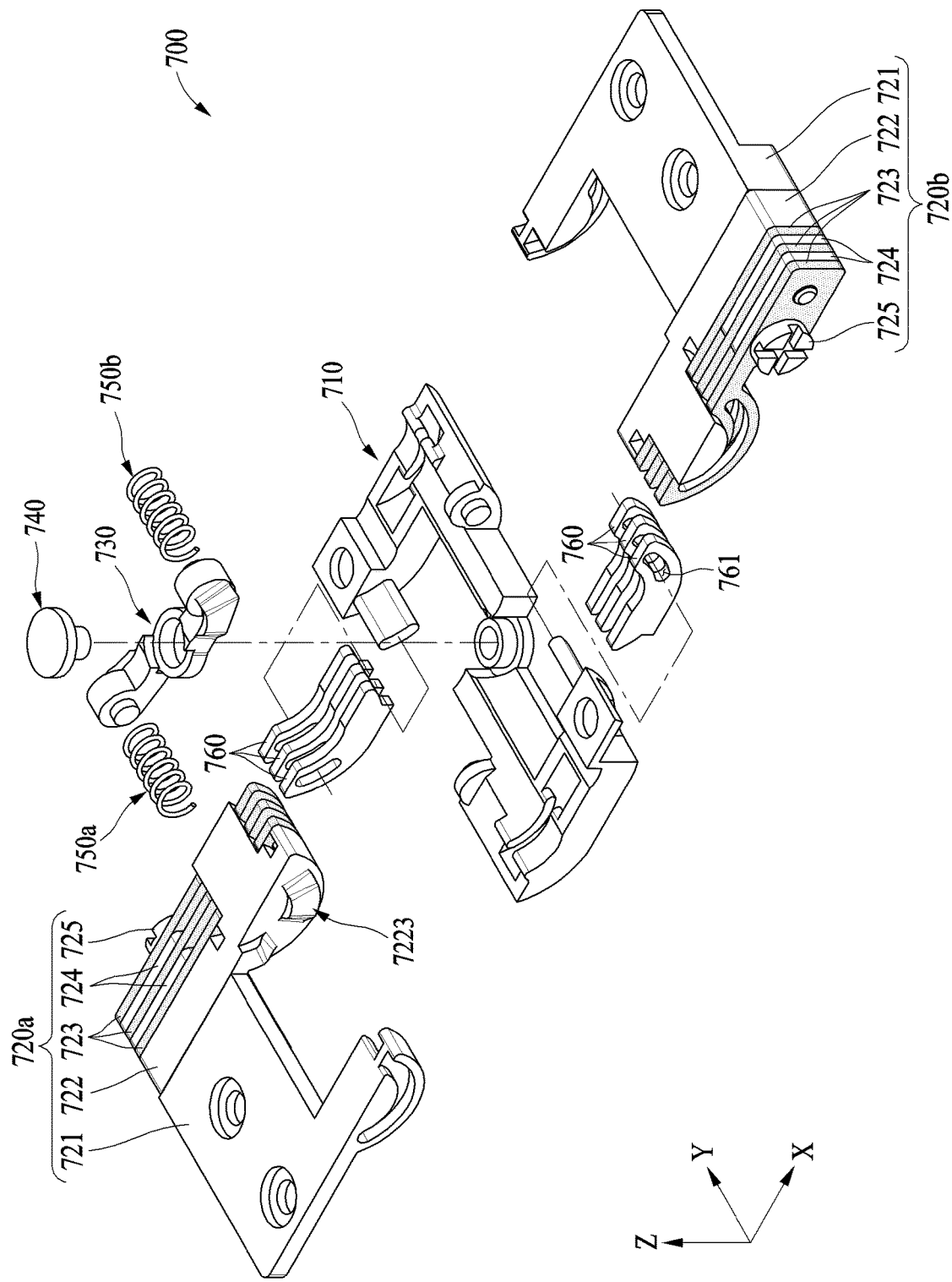
FIG. 7D is an exploded perspective view illustrating a hinge assembly according to an embodiment of the disclosure.
Figure 7E:
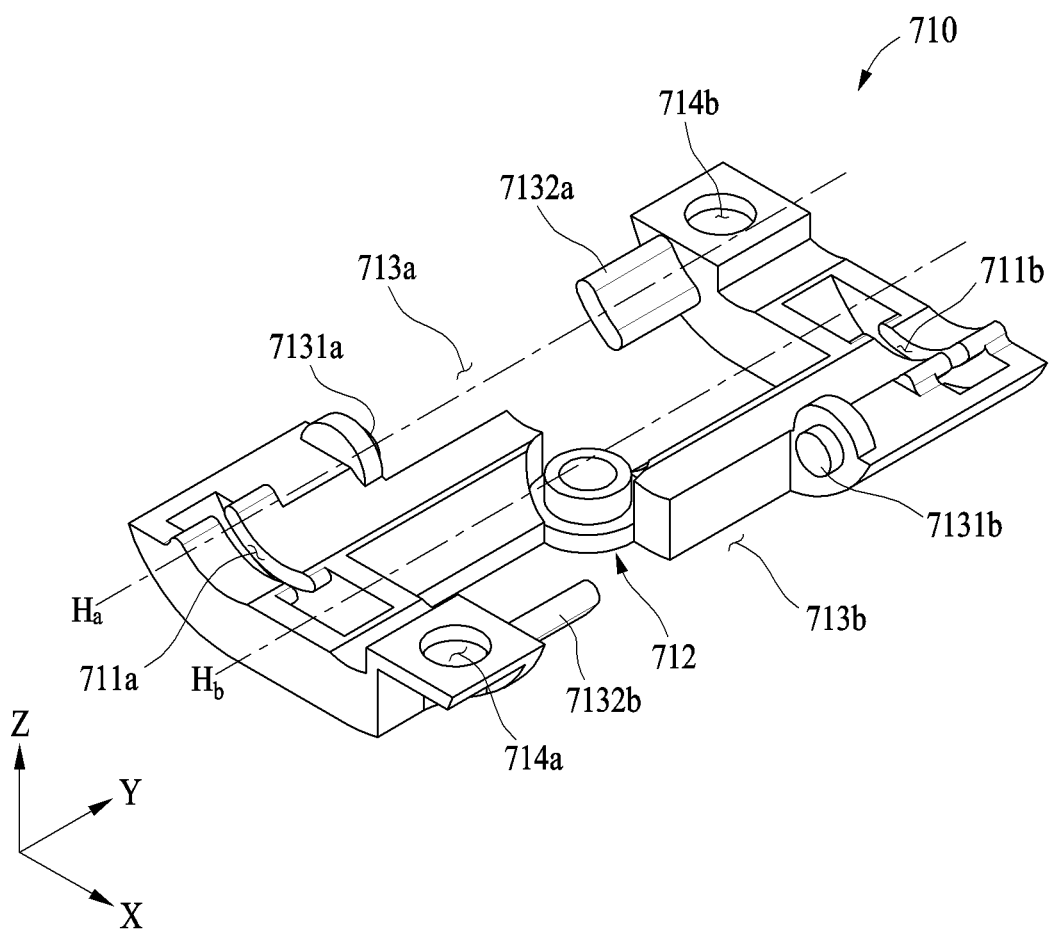
FIG. 7E is a perspective view illustrating a hinge bracket according to an embodiment of the disclosure.
Figure 7F:
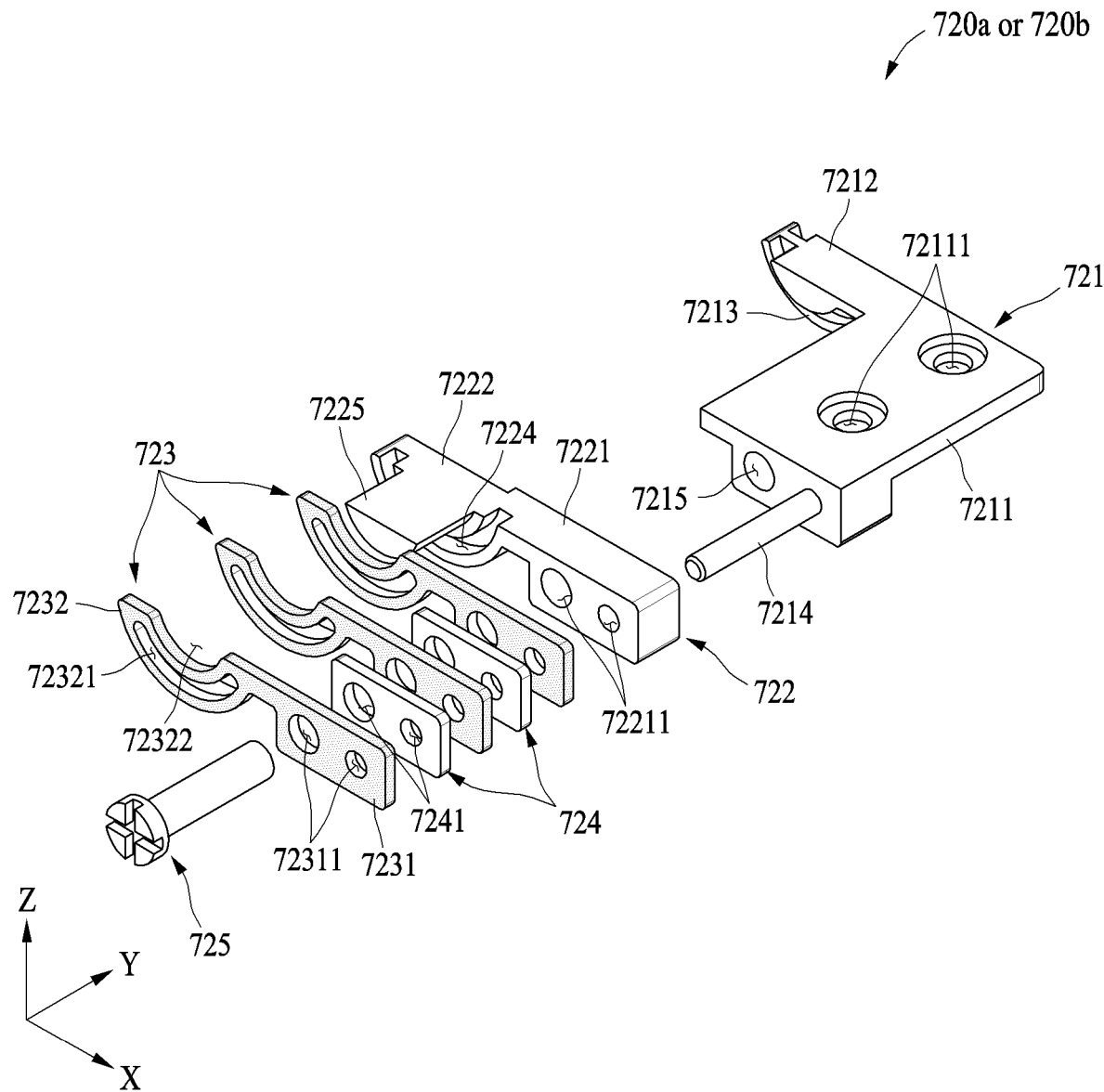
FIG. 7F is an exploded perspective view illustrating a hinge structure according to an embodiment of the disclosure.
Figure 7I:
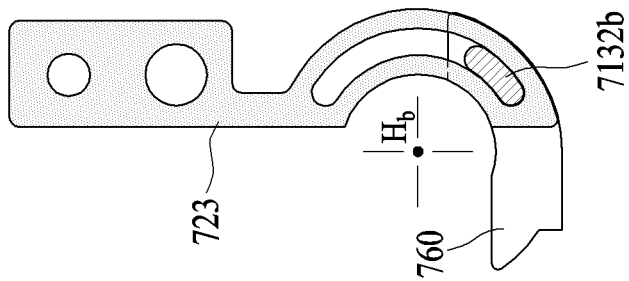
FIGS. 7G, 7H, and 7I illustrate a state in which a rotation plate and a fixing plate are in surface contact with each other according to various embodiment of the disclosure.
Figure 7H:
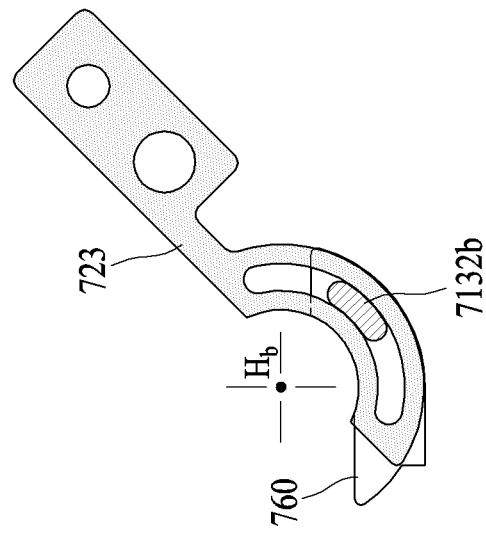
Figure 7G:
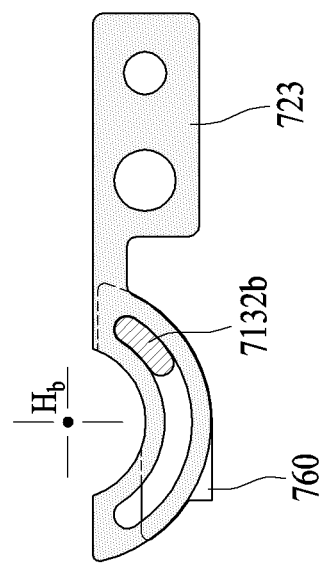

FIG. 7A is a perspective view illustrating an unfolded state of a hinge assembly according to an embodiment of the disclosure. FIG. 7B is a front view illustrating an unfolded state of a hinge assembly according to an embodiment of the disclosure. FIG. 7C is a perspective view illustrating a folded state of a hinge assembly according to an embodiment of the disclosure. FIG. 7D is an exploded perspective view illustrating a hinge assembly according to an embodiment of the disclosure. FIG. 7E is a perspective view illustrating a hinge bracket according to an embodiment of the disclosure. FIG. 7F is an exploded perspective view illustrating a hinge structure according to an embodiment of the disclosure. FIGS. 7G through 7I illustrate a state in which a rotation plate and a fixing plate are in surface contact with each other according to various embodiments of the disclosure.

Referring to FIGS. 7G through 7I, a hinge assembly 700 according to various embodiments may include a hinge bracket 710, a pair of hinge structures 720a and 720b, an intermediate member 730, a pin member 740, a pair of elastic members 750a and 750b and a fixing plate 760. The description of the configuration of the hinge assembly 400 of FIGS. 4A through 4T may be applied to a configuration of the hinge assembly 700 of FIGS. 7A through 7I which is substantially the same as that of the hinge assembly 400 of FIGS. 4A through 4T, unless otherwise stated.

In an embodiment of the disclosure, the hinge bracket 710 may include a pair of first rail structures 711a and 711b, an intermediate member connector 712, a pair of open spaces 713a and 713b, and a pair of bracket fixing holes 714a and 714b.

In an embodiment of the disclosure, the hinge bracket 710 may include a pair of first rail structures 711a and 711b so that the pair of hinge structures 720a and 720b may be rotatably coupled. At least a portion of a cross section of the pair of first rail structures 711a and 711b may have an arc shape in a direction from an upper surface (e.g., a surface facing a +z-axis direction) to a lower surface (e.g., a surface facing a −z-axis direction). The pair of first rail structures 711a and 711b may be recessed in an arc shape of a predetermined angle. For example, the first rail structure 711a or 711b may be recessed from an upper side (e.g., a +z side) to a lower side (e.g., a −z side) such that a cross section of the first rail structure 711a or 711b facing an xz plane may have an arc shape. At least a portion of the hinge structure 720a or 720b may be inserted into the first rail structure 711a or 711b in a direction (e.g., an +x-axis direction or −x-axis direction) perpendicular to a folding axis (e.g., the folding axis A of FIG. 2A). For example, a second rail structure 7212 of each of the pair of hinge structures 720a and 720b may be inserted into the pair of first rail structures 711a and 711b to interoperate with the pair of first rail structures 711a and 711b. The pair of first rail structures 711a and 711b may be formed to diagonally face each other. For example, the pair of first rail structures 711a and 711b may be formed to be point-symmetric with respect to the center of the hinge bracket 710, when the hinge bracket 710 is viewed from the front side. For example, one first rail structure 711a may be formed at a position relatively biased in the −x-axis direction and/or the −y-axis direction, in comparison to the other first rail structure 711b, and the other first rail structure 711b may be formed at a position relatively biased in the +x-axis direction and/or the +y-axis direction, in comparison to the one first rail structure 711a. The arc shapes of the pair of first rail structures 711a and 711b may define the pair of hinge axes Ha and Hb, respectively. For example, centers of the arc shapes of the pair of first rail structures 711a and 711b may be defined as a pair of hinge axes Ha and Hb, respectively. The pair of hinge axes Ha and Hb may be parallel to the folding axis A. The pair of hinge axes Ha and Hb may be spaced apart from each other by a designated interval.

In an embodiment of the disclosure, the intermediate member connector 712 may be formed near the center of the hinge bracket 710. The description of the intermediate member connector 412 of the hinge assembly 400 provided with reference to FIGS. 4A through 4T may be applied to the intermediate member connector 712.

In an embodiment of the disclosure, the pair of open spaces 713a and 713b may be formed on both sides (e.g., the −x side and the +x side) of the hinge bracket 710. The pair of open spaces 713a and 713b may be formed on both sides (e.g., the −x side and the +x side) of the hinge bracket 710, respectively, when the hinge bracket 710 is viewed from the front side. The open space 713a, 713b may be a space for an arrangement of at least the elastic member 750a or 750b, an extension (e.g., the extension 432a or 432b of FIG. 4G) of the intermediate member 730, and the fixing plate 760. For example, at least a portion of the open space 713a, 713b may be formed to have a longitudinal direction in the y-axis direction. The pair of open spaces 713a and 713b may be formed to diagonally face each other. For example, the pair of open spaces 713a and 713b may be formed to be point-symmetric with respect to the center of the hinge bracket 710 when the hinge bracket 710 is viewed from the front side.

In an embodiment of the disclosure, a first connection projection 7131a or 7131b may protrude in a direction parallel to the hinge axis Ha or Hb in the open space 713a or 713b. For example, one first connection projection 7131a may protrude in the +y-axis direction in one open space 713a, and the other first connection projection 7131b may protrude in the −y-axis direction in the other open space 713b. The first connection projection 7131a or 7131b may be inserted into and connected to one end portion (e.g., an end portion facing the −y-axis direction, or an end portion facing the +y-axis direction) of the elastic member 750a or 750b.

In an embodiment of the disclosure, a protruding pin 7132a or 7132b may protrude in a direction parallel to the hinge axis Ha or Hb in the open space 713a or 713b. The protruding pin 7132a or 7132b may be formed in a longitudinal direction (e.g., the y-axis direction) parallel to the hinge axis Ha or Hb. The protruding pin 7132a or 7132b may protrude to face the first connection projection 7131a or 7131b. For example, one protruding pin 7132a may protrude from one open space 713a in the +y-axis direction, and the other protruding pin 7132b may protrude from the other open space 713b in the −y-axis direction. The protruding pin 7132a or 7132b may have an arc-shaped cross section. For example, a cross section of the protruding pin 7132a or 7132b facing the xz plane may have an arc shape. The arc shape of the protruding pin 7132a or 7132b may be an arc having the hinge axis Ha or Hb as a center. However, this is merely an example, and the shape of the protruding pin 7132a or 7132b is not limited thereto. For example, the protruding pin 7132a or 7132b may also have a shape of a circular rod. At least one fixing plate 760 and at least one rotation plate 723 may be inserted into the protruding pin 7132a or 7132b.

In an embodiment of the disclosure, the hinge bracket 710 may include a pair of bracket fixing holes 714a and 714b to fix the hinge bracket 710 to a hinge housing (e.g., the hinge housing 313 of FIG. 3). For example, a fastening member (e.g., a screw, a bolt, a pin, and/or a counterpart structure) may be inserted into each of the pair of bracket fixing holes 714a and 714b. The pair of bracket fixing holes 714a and 714b may be formed to diagonally face each other. For example, the pair of bracket fixing holes 714a and 714b may be formed to be point-symmetric with respect to the center of the hinge bracket 710 when the hinge bracket 710 is viewed from the front side. For example, one bracket fixing hole 714a may be formed at a position relatively biased in the +x-axis direction and/or −y-axis direction, in comparison to the other bracket fixing hole 714b, and the other bracket fixing hole 714b may be formed at a position relatively biased in the −x-axis direction and/or the +y-axis direction, in comparison to the one bracket fixing hole 714a. For example, the pair of bracket fixing holes 714a and 714b may be disposed in a diagonal direction that crosses a direction in which the pair of first rail structures 711a and 711b are disposed.

In an embodiment of the disclosure, the pair of hinge structures 720a and 720b may be rotatably connected to the hinge bracket 710. For example, the pair of hinge structures 720a and 720b may be rotatably connected to the pair of first rail structures 711a and 711b, respectively. The pair of hinge structures 720a and 720b may be disposed to diagonally face each other. For example, the pair of hinge structures 720a and 720b may be disposed to be point-symmetric with respect to the center of the hinge assembly 700 when the hinge assembly 700 is viewed from the front side.

In an embodiment of the disclosure, each of the pair of hinge structures 720a and 720b may include a first part 721, a second part 722, a rotation plate 723, a spacer 724, and a second alignment pin 725.

In an embodiment of the disclosure, the first part 721 may be rotatably connected to the first rail structure 711a or 711b of the hinge bracket 710. The first part 721 may be fastened to a first housing (e.g., the first housing 311 of FIG. 3) or a second housing (e.g., the second housing 312 of FIG. 3).

In an embodiment of the disclosure, the first part 721 may include a first body 7211, a second body 7212, a second rail structure 7213, and an alignment pin 7214.

In an embodiment of the disclosure, the first body 7211 may have a plate shape. The first body 7211 may be fixedly connected to the first housing (e.g., the first housing 311 of FIG. 3) or the second housing (e.g., the second housing 312 of FIG. 3). The first body 7211 may be parallel to the front surface (e.g., the surface facing the +z-axis direction based on the state of FIG. 3) of the first housing 311 or the second housing 312. At least one housing fixing hole 72111 for fixing the hinge structure 720a or 720b to the first housing 311 or the second housing 312 may be formed in the first body 7211. For example, the housing fixing hole 72111 may be formed to penetrate the first body 7211 in the z-axis direction. For example, a fastening member (e.g., a screw, a bolt, a pin, and/or a counterpart structure) may be inserted into the housing fixing hole 72111. Although two housing fixing holes 72111 are formed as shown in FIG. 7F, this is merely an example, and a number of housing fixing holes 72111 is not limited thereto.

In an embodiment of the disclosure, the second body 7212 may be formed to extend from at least a portion of one end of the first body 7211. For example, in FIG. 7F, the second body 7212 may be formed to extend in the −x axis direction from at least a portion of an end of the first body 7211 facing the −x axis direction. The second body 7212 may be formed integrally with the first body 7211. At least a portion of a cross section of the second body 7212 may have an arc shape in the direction from the upper surface (e.g., the surface facing the +z-axis direction) to the lower surface (e.g., the surface facing the −z-axis direction). For example, at least a portion of a cross section of the second body 7212 facing the xz plane may have an arc shape.

In an embodiment of the disclosure, the second rail structure 7213 may be formed on a lower side (e.g., a side facing the −z-axis direction) of the second body 7212. The second rail structure 7213 may be formed to protrude from the second body 7212. At least a portion of a cross section of the second rail structure 7213 may have an arc shape in the direction from the upper surface (e.g., the surface facing the +z-axis direction) to the lower surface (e.g., the surface facing the −z-axis direction). For example, at least a portion of a cross section of the second rail structure 7213 facing the xz plane may have an arc shape. The arc shape of the second rail structure 7213 may correspond to the arc shape of the first rail structure 711*a* or 711*b*. The hinge structure 720*a* or 720*b* may be connected to the hinge bracket 710 such that the second rail structure 7213 may be inserted into the first rail structure 711*a* or 711*b*. The second rail structure 7213 may rotate about the hinge axis Ha or Hb within a designated angle range along the first rail structure 711*a* or 711*b*. Based on the above structure, in a state in which the second rail structure 7213 is inserted into the first rail structure 711*a* or 711*b*, the hinge structure 720*a* or 720*b* may rotate within a designated angle range with respect to the hinge bracket 710. For example, the hinge structure 720*a* or 720*b* may rotate in the xz plane about a hinge axis Ha or Hb formed by the first rail structure 711*a* or 711*b* and the second rail structure 7213. The first rail structure 711*a* or 711*b* and the second rail structure 7213 may allow only a rotational motion of the hinge structure 720*a* or 720*b* on the xz plane and may restrict a translational movement and/or a rotational motion of the hinge structure 720*a* or 720*b* in another direction. For example, an outer portion of the first rail structure 711*a* or 711*b* in the radial direction may be formed to be stepped with a relatively large width (e.g., a width in the y-axis direction), in comparison to an inner portion thereof. An outer portion of the second rail structure 7213 in the radial direction may be formed to be stepped with a relatively large width (e.g., a width in the y-axis direction), in comparison to an inner portion thereof. The pair of first rail structures 711*a* and 711*b* protrude and the second rail structure 7213 is recessed, as illustrated and described above, however, this is merely an example. For example, the pair of first rail structures 711*a* and 711*b* may be recessed, and the second rail structure 7213 may protrude.

In an embodiment of the disclosure, a first alignment pin 7214 and a first alignment hole 7215 may be formed in the first body 7211. The first alignment pin 7214 and the first alignment hole 7215 may be configured to align and connect the second part 722, the rotation plate 723, and the spacer 724 to the first part 721. For example, the first alignment pin 7214 and the first alignment hole 7215 may be formed in an end portion of the first body 7211 facing the −y-axis direction. The first alignment pin 7214 may be formed to protrude from one end portion (e.g., an end portion facing the −y-axis direction) of the first body 7211 in a longitudinal direction (e.g., a −y-axis direction). The first alignment pin 7214 may extend in a direction parallel to the hinge axis Ha or Hb. The first alignment pin 7214 may be inserted into the second part 722, the rotation plate 723, and the spacer 724. The first alignment hole 7215 may be recessed from the one end portion (e.g., the end portion facing the −y-axis direction) of the first body 7211 in an inward direction (e.g., a +y-axis direction). The first alignment hole 7215 may be recessed in a direction parallel to the hinge axis Ha or Hb. The second alignment pin 725 may be inserted into the first alignment hole 7215. The first alignment pin 7214 and the first alignment hole 7215 may be spaced apart from each other by a designated interval.

In an embodiment of the disclosure, the second part 722 may be a component formed separately from the first part 721. The second part 722 may be connected to one end portion of the first part 721 by the first alignment pin 7214 and the second alignment pin 725. The second part 722 may be connected to the first body 7211 of the first part 721 to be disposed on an opposite side of the second body 7212. For example, referring to FIG. 7F, the second part 722 may be connected to an end portion of the first part 721 facing the −y-axis direction to be disposed on the opposite side of the second body 7212.

In an embodiment of the disclosure, the second part 722 may include a third body 7221, a fourth body 7222, a first cam structure 7223, a rotation guide groove 7224, and a protrusion guide 7225.

In an embodiment of the disclosure, the third body 7221 may be connected to the first part 721. A second alignment hole 72211 may be formed in the third body 7221. The second alignment hole 72211 may be formed to penetrate the third body 7221. For example, the second alignment hole 72211 may penetrate the third body 7221 in the y-axis direction. At least one second alignment hole 72211 may be formed. For example, a pair of second alignment holes 72211 may be formed, and the first alignment pin 7214 and the second alignment pin 725 may be inserted into the second alignment holes 72211, respectively.

In an embodiment of the disclosure, the fourth body 7222 may be formed to extend from one end portion of the third body 7221. For example, the fourth body 7222 may be formed to extend from an end portion of the third body 7221 facing the −x-axis direction in the −x-axis direction, as shown in FIG. 7F. The fourth body 7222 may be formed in an arc shape of a predetermined angle. In a state in which the second part 722 is connected to the first part 721, the fourth body 7222 may be disposed on an opposite side of the second body 7212.

In an embodiment of the disclosure, the first cam structure 7223 may be formed on one surface of the fourth body 7222. For example, in the state in which the second part 722 is connected to the first part 721, the first cam structure 7223 may be formed on a surface of the fourth body 7222 facing the second body 7212. For example, referring to FIG. 7D, the first cam structure 7223 may be formed on a surface of the fourth body 7222 facing the −y-axis direction. The first cam structure 7223 may be formed along an arc having the hinge axis Ha or Hb as a center. The first cam structure 7223 may have at least one mountain and/or valley structure. For example, the first cam structure 7223 may protrude to include a first inclined surface, a first flat surface, and a second inclined surface.

In an embodiment of the disclosure, the rotation guide groove 7224 may be formed on another surface of the fourth body 7222. The rotation guide groove 7224 may be formed on a surface opposite to the surface on which the first cam structure 7223 is formed. For example, in the state in which the second part 722 is connected to the first part 721, the rotation guide groove 7224 may be formed on a surface opposite to a surface of the fourth body 7222 facing the second body 7212. For example, in FIG. 7F, the rotation guide groove 7224 may be formed on a surface of the fourth body 7222 facing the −y-axis direction. The rotation guide groove 7224 may be recessed along an arc having the hinge axis Ha or Hb as a center. An end portion of the protruding pin 7312*a* or 7312*b* of the hinge bracket 710 may be inserted into the rotation guide groove 7224. When the hinge structure 720*a* or 720*b* is rotated about the hinge axis Ha or Hb, an end portion of the protruding pin 7312*a* or 7312*b* may move along the rotation guide groove 7224, so that a path of rotation of the second part 722 relative to the protruding pin 7312*a* or 7312*b* may be guided.

In an embodiment of the disclosure, the protrusion guide 7225 may be formed to protrude from another surface of the fourth body 7222. The protrusion guide 7225 may be formed on the same side as a side on which the rotation guide groove 7224 is formed. For example, in FIG. 7F, the protrusion guide 7225 may be formed to protrude in the −y-axis direction from a side of the fourth body 7222 facing the −y-axis direction. At least a portion of a cross section of the protrusion guide 7225 may have an arc shape in the direction from the upper surface (e.g., the surface facing the +z-axis direction) to the lower surface (e.g., the surface facing the −z-axis direction). For example, in the protrusion guide 7225, the lower surface (e.g., the surface facing the −z-axis direction) may have an arc shape having the hinge axis Ha or Hb as a center. The lower surface (e.g., the surface facing the −z-axis direction) of the protrusion guide 7225 may be seated on a guide seating portion 7232 of the rotation plate 723, and relative positions of the second part 722 and the rotation plate 723 may be aligned. In addition, the lower surface (e.g., the surface facing the −z-axis direction) of the protrusion guide 7225 may rotate along an arc-shaped upper surface (e.g., a surface facing the +z-axis direction) of the fixing plate 760 while being in contact with the arc-shaped upper surface, and a path of rotation of the second part 722 relative to the fixing plate 760 may be guided.

In an embodiment of the disclosure, the rotation plate 723 may have a plate shape. At least one rotation plate 723 may be provided. The rotation plate 723 may be connected to one end portion of the second part 722 by the first alignment pin 7214 and the second alignment pin 725. For example, the rotation plate 723 may be connected to an end portion of the second part 722 facing the −y-axis direction, as shown in FIG. 7F.

In an embodiment of the disclosure, the rotation plate 723 may include a first portion 7231 and a second portion 7232.

In an embodiment of the disclosure, the first portion 7231 may correspond to the third body 7221 of the second portion 722. A third alignment hole 72311 may be formed in the first portion 7231. The third alignment hole 72311 may be formed to penetrate the first portion 7231. For example, the third alignment hole 72311 may penetrate the first portion 7231 in the y-axis direction. At least one third alignment hole 72311 may be formed. For example, a pair of third alignment holes 72311 may be formed, and the first alignment pin 7214 and the second alignment pin 725 may be inserted into the third alignment holes 72311, respectively.

In an embodiment of the disclosure, the second portion 7232 may correspond to the fourth body 7222 of the second part 722. The second portion 7232 may be formed to extend from one end portion of the first portion 7231. For example, the second portion 7232 may be formed to extend from an end portion of the first portion 7231 facing the −x-axis direction in the −x-axis direction, as shown in FIG. 7F. The second portion 7232 may have an arc shape of a predetermined angle.

In an embodiment of the disclosure, a rotation guide hole 72321 may be formed in the second portion 7232. The rotation guide hole 72321 may be formed to penetrate the second portion 7232. For example, the rotation guide hole 72321 may penetrate the second portion 7232 in the y-axis direction. The rotation guide hole 72321 may be formed along an arc having the hinge axis Ha or Hb as a center. The protruding pin 7312*a* or 7312*b* of the hinge bracket 710 may be inserted into the rotation guide hole 72321. When the hinge structure 720*a* or 720*b* is rotated about the hinge axis Ha or Hb, the protruding pin 7312*a* or 7312*b* may move along the rotation guide hole 72321, so that a path of rotation of the rotation plate 723 relative to the protruding pin 7312*a* or 7312*b* may be guided.

In an embodiment of the disclosure, a guide seating portion 72322 may be formed in the second portion 7232. The guide seating portion 72322 may be formed by recessing an upper surface (e.g., a surface facing the +z-axis direction) of the second portion 7232. The guide seating portion 72322 may have an arc shape with the hinge axis Ha or Hb as a center. The guide seating portion 72322 may be formed in a shape corresponding to that of the lower surface (e.g., the surface facing the −z-axis direction) of the protrusion guide 7225. The protrusion guide 7225 of the second part 722 may be seated on the guide seating portion 72322. The lower surface (e.g., the surface facing the −z-axis direction) of the protrusion guide 7225 may be seated on the guide seating portion 7232 of the rotation plate 723, and relative positions of the second part 722 and the rotation plate 723 may be aligned.

In an embodiment of the disclosure, the spacer 724 may correspond to the first portion 7231 of the rotation plate 723. The spacer 724 may have a plate shape. A fourth alignment hole 7241 may be formed in the spacer 724. The fourth alignment hole 7241 may be formed to penetrate the spacer 724. For example, the fourth alignment hole 7241 may penetrate the spacer 724 in the y-axis direction. At least one fourth alignment hole 7241 may be formed. For example, a pair of fourth alignment holes 7241 may be formed, and the first alignment pin 7214 and the second alignment pin 725 may be inserted into the fourth alignment holes 7241, respectively.

In an embodiment of the disclosure, at least one spacer 724 may be provided. The rotation plate 723 and the spacer 724 may be alternately connected to one side of the second part 722. For example, the rotation plate 723 and the spacer 724 may be alternately disposed. For example, as shown in FIG. 7F, three rotation plates 723 and two spacers 724 may be alternately disposed. However, this is merely an example, and a number of rotation plates 723 and a number of spacers 724 are not limited thereto. Since an area of a rotation plate 723 is greater than an area of a spacer 724, a gap with a predetermined width may be formed between a plurality of rotation plates 723 when the rotation plates 723 and the spacers 724 are alternately disposed.

In an embodiment of the disclosure, the second alignment pin 725 may align positions of the first part 721, the second part 722, the rotation plate 723, and the spacer 724 and connect the first part 721, the second part 722, the rotation plate 723, and the spacer 724 to each other. The second alignment pin 725 may pass through the first alignment hole 7215 of the first part 721, the second alignment hole 72211 of the second part 722, the third alignment hole 72311 of the rotation plate 723, and the fourth alignment hole 7241 of the spacer 724. For example, an end portion of the second alignment pin 725 may be fixedly connected to the first alignment hole 7215 of the first part 721. For example, a screw thread may be formed in the end portion of the second alignment pin 725, and a screw thread corresponding to the formed screw thread may be formed in the first alignment hole 7215 of the first part 721. Based on the above structure, the first part 721, the second part 722, the rotation plate 723, and the spacer 724 may be fixedly connected to each other by the second alignment pin 725.

In an embodiment of the disclosure, the first alignment pin 7214 and the second alignment pin 725 may align the positions of the first part 721, the second part 722, the rotation plate 723, and the spacer 724, and may connect the first part 721, the second part 722, the rotation plate 723, and the spacer 724 to each other. The first alignment pin 7214 and the second alignment pin 725 may have a longitudinal direction (e.g., a y-axis direction) parallel to the hinge axis Ha or Hb. The first alignment pin 7214 and the second alignment pin 725 may be spaced apart from each other, to limit translational movements in the x-axis direction and the z-axis direction between the first part 721, the second part 722, the rotation plate 723, and the spacer 724, and limit rotational movements in all directions. The first alignment pin 7214 is formed integrally with the first part 721, as illustrated and described above, however, this is merely an example. For example, the first alignment pin 7214 may also be provided as a separate component such as the second alignment pin 725.

In an embodiment of the disclosure, the fixing plate 760 may have a plate shape. At least one fixing plate 760 may be provided. A fixing hole 761 may be formed in the fixing plate 760. For example, the fixing hole 761 may be formed to penetrate the fixing plate 760. For example, the fixing hole 761 may penetrate the plate 760 in the y-axis direction. The fixing hole 761 may have an arc shape corresponding to the protruding pin 7213a or 7213b of the hinge bracket 710. The protruding pin 7213a or 7213b is inserted into the fixing hole 761 of the fixing plate 760, the fixing plate 760 may be connected to the protruding pin 7213a or 7213b. An insertion structure of the fixing hole 761 and the protruding pin 7213a or 7213b may limit translational movements of the fixing plate 760 in the x-axis direction and the z-axis direction with respect to the hinge bracket 410, and rotational movements in all directions. At least a portion of an upper surface (e.g., a surface facing the +z-axis direction) of the fixing plate 760 may have an arc shape. For example, the upper surface (e.g., the surface facing the +z-axis direction) of the fixing plate 760 may have an arc shape having the hinge axis Ha or Hb as a center. The upper surface (e.g., the surface facing the +z-axis direction) of the fixing plate 760 may have a shape corresponding to that of the lower surface (e.g., the surface facing the −z-axis direction) of the protrusion guide 7225. The protrusion guide 7225 may be seated on the upper surface (e.g., the surface facing the +z-axis direction) of the fixing plate 760. When the second part 722 is rotated about the hinge axis Ha or Hb, the lower surface (e.g., the surface facing the −z-axis direction) of the protrusion guide 7225 may rotate along the arc-shaped upper surface (e.g., the surface facing the +z-axis direction) of the fixing plate 760 while being in contact with the upper surface of the fixing plate 760, and a path of rotation of the second part 722 relative to the fixing plate 760 may be guided.

In an embodiment of the disclosure, the fixing plate 760 may be alternately disposed with the rotation plate 723. For example, the fixing plate 760 and the rotation plate 723 may be alternately disposed in the y-axis direction. A thickness of the fixing plate 760 may substantially correspond to a thickness of the spacer 724. For example, as shown in FIG. 7A, three fixing plates 760 and three rotation plates 723 may be alternately disposed in the y-axis direction. However, this is merely an example, and a number of fixing plates 760 and a number of rotation plates 723 are not limited thereto. The fixing plate 760 and the rotation plate 723 that are alternately disposed may be in surface contact with each other in at least some areas. An elastic force provided by the elastic member 750a or 750b may be perpendicular to a surface of each of the fixing plate 760 and the rotation plate 723. Accordingly, the elastic force of the elastic member 750a or 750b may act as a normal force for generating a friction force between the fixing plate 760 and the rotation plate 723. A direction in which the fixing plate 760 and the rotation plate 723 are inserted into the protruding pin 7132a or 7132b may coincide with a direction of the elastic force of the elastic member 750a or 750b. For example, the fixing plate 760 and the rotation plate 723 may be inserted in the y-axis direction into the protruding pin 7132a or 7132b protruding in the y-axis direction, and the elastic force of the elastic member 750a or 750b may be directed in the y-axis direction. Based on the above structure, the fixing plate 760 and the rotation plate 723 may be in close contact with each other in the y-axis direction by the elastic force of the elastic member 750a or 750b. Accordingly, a large friction force may be generated between the fixing plate 760 and the rotation plate 723. For example, as shown in FIGS. 7G through 7I, when the hinge structure 720a or 720b is rotated about the hinge axis Ha or Hb, the rotation plate 723 may be relatively rotated while being in surface contact with the fixing plate 760, and a large friction force may be generated between the rotation plate 723 and the fixing plate 760. As a result, the friction force acting between the rotation plate 723 and the fixing plate 760 may further increase an open detent force, an intermediate state stopping force, and/or a close detent force.

In an embodiment of the disclosure, an electronic device 300 may include: a display 250 including a first area 251, a second area 252, and a folding area 253 between the first area 251 and the second area 252, a first housing 311 configured to support the first area 251, a second housing 312 configured to support the second region 252, and a hinge assembly 400 configured to connect the first housing 311 and the second housing 312 and operate between a folded state in which the first area 251 and the second area 252 face each other and an unfolded state in which the first area 251 and the second area 252 do not face each other, wherein the hinge assembly 400 includes a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424.

In an embodiment of the disclosure, each of the pair of hinge structures 420a and 420b may include a first body 421 fastened to the first housing 311 or the second housing 312, and a second body 422 extending from the first body 421 and including a second rail structure 423 rotatably coupled to the first rail structure 411a or 411b.

In an embodiment of the disclosure, the first cam structure 424 may be formed on one surface of the second rail structure 423.

In an embodiment of the disclosure, the pair of hinge structures 420a and 420b may be disposed to be point-symmetric about the middle axis M, when the electronic device 300 is viewed from a front side based on the unfolded state.

In an embodiment of the disclosure, the intermediate member 430 may include a central portion 431 rotatably connected to the hinge bracket 410, and a pair of extensions 432a and 432b extending from the central portion 431 to both sides thereof and including the second cam structure 434a or 434b formed on one surface thereof.

In an embodiment of the disclosure, the elastic force of the elastic member 450a or 450b may generate torque for rotating the intermediate member 430 in the direction in which the second cam structure 434a or 434b is pressed toward the first cam structure 424.

In an embodiment of the disclosure, each of the pair of hinge structures 720a and 720b may include a first part 721 including a first body 7211 fastened to the first housing 311 or the second housing 312 and a second body 7212 extending from one side of the first body 7211 and including a second rail structure 7213 rotatably coupled to the first rail structure 711a or 711b, and a second part 722 connected to the first part 721 on another side of the first body 7211 and including the first cam structure 7223.

In an embodiment of the disclosure, each of the pair of hinge structures 720a and 720b may further include at least one rotation plate 723 and at least one spacer 724 alternately connected to each other on one side of the second part 722, and the rotation plate 723 may have a cross-sectional area greater than that of than the spacer 724.

In an embodiment of the disclosure, a protruding pin 7132a or 7132b may be formed to protrude from each of both sides of the hinge bracket 710 in a longitudinal direction, and at least one fixing plate 760 may be inserted into and fixed to the protruding pin 7132a or 7132b.

In an embodiment of the disclosure, an arc-shaped rotation guide hole 7224, into which the protruding pin 7132a or 7132b is to be inserted, may be formed on one side of the rotation plate 723 to guide a path of rotation relative to the protruding pin 7132a or 7132b.

In an embodiment of the disclosure, the rotation plate 723 may be rotated relative to the fixing plate 760 while at least a partial area of the rotation plate 723 is in surface contact with the fixing plate 760, and an elastic force applied by the elastic member 750a or 750b may generate a friction force between the rotation plate 723 and the fixing plate 760.

In an embodiment of the disclosure, the first cam structure 424 may be formed to protrude to include a first inclined surface 4241, a first flat surface 4242, and a second inclined surface 4243, and the second cam structure 434a or 434b may be formed to protrude to include a third inclined surface 4341, a second flat surface 4342, and a fourth inclined surface 4343.

In an embodiment of the disclosure, in the unfolded state, the first inclined surface 4241 of the first cam structure 424 may be in contact with the third inclined surface 4341 of the second cam structure 434a or 434b. The elastic force of the elastic member 450a or 450b may form a reaction force in a direction perpendicular to the first inclined surface 4241 and the third inclined surface 4341, and the reaction force may act as torque in a direction to maintain the pair of hinge structures 420a and 420b in the unfolded state.

In an embodiment of the disclosure, in an intermediate state between the unfolded state and the collapsed state, the first flat surface 4242 of the first cam structure 424 may be in contact with the second flat surface 4342 of the second cam structure 434a or 434b. The elastic force of the elastic member 450a or 450b may form a reaction force in a direction perpendicular to the first flat surface 4242 and the second flat surface 4342, and the reaction force may act as a normal force against a friction force that is generated between the first flat surface 4242 and the second flat surface 4342 and that maintains the intermediate state.

In an embodiment of the disclosure, in the folded state, the second inclined surface 4243 of the first cam structure 424 may be in contact with the fourth inclined surface 4343 of the second cam structure 434a or 434b. The elastic force of the elastic member 450a or 450b may form a reaction force in a direction perpendicular to the second inclined surface 4243 and the fourth inclined surface 4343, and the reaction force may act as torque in a direction to maintain the pair of hinge structures 420a and 420b in the folded state.

In an embodiment of the disclosure, a hinge assembly 400 applied to a foldable electronic device 300 including a first housing 311 and a second housing 312 may include a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424.

In an embodiment of the disclosure, each of the pair of hinge structures 420a and 420b may include a first body 421 fastened to the first housing 311 or the second housing 312, and a second body 422 extending from the first body 421 and including a second rail structure 423 rotatably coupled to the first rail structure 411a or 411b. The first cam structure 424 may be formed on one surface of the second rail structure 423.

In an embodiment of the disclosure, the intermediate member 430 may include a central portion 431 rotatably connected to the hinge bracket 410, and a pair of extensions 432a and 432b extending from the central portion 431 to both sides thereof and including the second cam structure 434a or 434b formed on one surface thereof.

In an embodiment of the disclosure, the elastic force of the elastic member 450a or 450b may generate torque for rotating the intermediate member 430 in the direction in which the second cam structure 434a or 434b is pressed toward the first cam structure 424.

In an embodiment of the disclosure, an electronic device 300 may include a display 250 including a first area 251, a second area 252, and a folding area 253 between the first area 251 and the second area 252, a first housing 311 configured to support the first area 251, a second housing 312 configured to support the second region 252, and a hinge assembly 400 configured to connect the first housing 311 and the second housing 312 and operate between a folded state in which the first area 251 and the second area 252 face each other and an unfolded state in which the first area 251 and the second area 252 do not face each other, wherein the hinge assembly 400 includes a hinge bracket 410 including a pair of first rail structures 411a and 411b formed to define a pair of hinge axes Ha and Hb, a pair of hinge structures 420a and 420b having one side connected to the first housing 311 or the second housing 312 and another side rotatably connected about the hinge axis Ha or Hb along the first rail structure 411a or 411b, and including a first cam structure 424, an intermediate member 430 connected to the hinge bracket 410 to be rotatable about a middle axis M perpendicular to the pair of hinge axes Ha and Hb between the pair of hinge structures 420a and 420b, wherein a second cam structure 434a or 434b interoperating with the first cam structure 424 is formed in each of both end portions of the intermediate member 430, and an elastic member 450a or 450b configured to provide an elastic force to the intermediate member 430 in a direction in which the second cam structure 434a or 434b is pressed toward the first cam structure 424. Each of the pair of hinge structures 420a and 420b may include a first body 421 fastened to the first housing 311 or the second housing 312, and a second body 422 extending from the first body 421 and including a second rail structure 423 rotatably coupled to the first rail structure 411a or 411b. The first cam structure 424 may be on one surface of the second rail structure 423. The intermediate member 320 may include a central portion 431 rotatably connected to the hinge bracket 410, and a pair of extensions 432a and 432b extending from the central portion 431 to both sides thereof and including the second cam structure 434a or 434b formed on one surface thereof. The elastic force of the elastic member 450a or 450b may generate torque for rotating the intermediate member 430 in a direction in which the second cam structure 434a or 434b is pressed toward the first cam structure 424.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display comprising a first area, a second area, and a folding area between the first area and the second area;
   a first housing configured to support the first area;
   a second housing configured to support the second area; and
   a hinge assembly configured to connect the first housing and the second housing and operate between a folded state in which the first area and the second area face each other and an unfolded state in which the first area and the second area do not face each other,
   wherein the hinge assembly comprises:
      a hinge bracket comprising a pair of first rail structures formed to define a pair of hinge axes,
      a pair of hinge structures having one side connected to the first housing or the second housing and another side rotatably connected about the hinge axis along the first rail structure, and comprising a first cam structure,
      an intermediate member connected to the hinge bracket to be rotatable about a middle axis perpendicular to the pair of hinge axes between the pair of hinge structures, wherein a second cam structure interoperating with the first cam structure is formed in each of both end portions of the intermediate member, and
      an elastic member configured to provide an elastic force to the intermediate member in a direction in which the second cam structure is pressed toward the first cam structure.

2. The electronic device of claim 1, wherein each of the pair of hinge structures comprises:
   a first body fastened to the first housing or the second housing; and
   a second body extending from the first body, and comprising a second rail structure rotatably coupled to the first rail structure.

3. The electronic device of claim 2, wherein the first cam structure is formed on one surface of the second rail structure.

4. The electronic device of claim 1, wherein the pair of hinge structures are disposed to be point-symmetric about the middle axis, when the electronic device is viewed from a front side based on the unfolded state.

5. The electronic device of claim 1, wherein the intermediate member comprises:
   a central portion rotatably connected to the hinge bracket; and
   a pair of extensions extending from the central portion to both sides thereof and comprising the second cam structure formed on one surface thereof.

6. The electronic device of claim 1, wherein the elastic force of the elastic member generates torque for rotating the intermediate member in the direction in which the second cam structure is pressed toward the first cam structure.

7. The electronic device of claim 1, wherein each of the pair of hinge structures comprises:
   a first part comprising a first body fastened to the first housing or the second housing, and a second body extending from one side of the first body and comprising a second rail structure rotatably coupled to the first rail structure; and
   a second part connected to the first part on another side of the first body, and comprising the first cam structure.

8. The electronic device of claim 7,
   wherein each of the pair of hinge structures further comprises at least one rotation plate and at least one spacer alternately connected to each other on one side of the second part, and
   wherein the at least one rotation plate has a cross-sectional area greater than a cross-sectional area of the at least one spacer.

9. The electronic device of claim 8,
   wherein a protruding pin is formed to protrude from each of both sides of the hinge bracket in a longitudinal direction, and
   wherein at least one fixing plate is inserted into and fixed to the protruding pin.

10. The electronic device of claim 9, wherein an arc-shaped rotation guide hole, into which the protruding pin is to be inserted, is formed on one side of the at least one rotation plate to guide a path of rotation relative to the protruding pin.

11. The electronic device of claim 10,
wherein the at least one rotation plate is rotated relative to the fixed plate while at least a partial area of the at least one rotation plate is in surface contact with the at least one fixed plate, and
wherein an elastic force applied by the elastic member generates a friction force between the at least one rotation plate and the at least one fixed plate.

12. The electronic device of claim 1,
wherein the first cam structure is formed to protrude to include a first inclined surface, a first flat surface, and a second inclined surface, and
wherein the second cam structure is formed to protrude to include a third inclined surface, a second flat surface, and a fourth inclined surface.

13. The electronic device of claim 12, wherein, in the unfolded state:
the first inclined surface of the first cam structure is in contact with the third inclined surface of the second cam structure,
the elastic force of the elastic member forms a reaction force in a direction perpendicular to the first inclined surface and the third inclined surface, and
the reaction force acts as torque in a direction to maintain the pair of hinge structures in the unfolded state.

14. The electronic device of claim 12, wherein, in an intermediate state between the unfolded state and the folded state:
the first flat surface of the first cam structure is in contact with the second flat surface of the second cam structure,
the elastic force of the elastic member forms a reaction force in a direction perpendicular to the first flat surface and the second flat surface, and
the reaction force acts as a normal force against a friction force that is generated between the first flat surface and the second flat surface and that maintains the intermediate state.

15. The electronic device of claim 12, wherein, in the folded state:
the second inclined surface of the first cam structure is in contact with the fourth inclined surface of the second cam structure,
the elastic force of the elastic member forms a reaction force in a direction perpendicular to the second inclined surface and the fourth inclined surface, and
the reaction force acts as torque in a direction to maintain the pair of hinge structures in the folded state.

16. A hinge assembly applied to a foldable electronic device comprising a first housing and a second housing, the hinge assembly comprising:
a hinge bracket comprising a pair of first rail structures formed to define a pair of hinge axes;
a pair of hinge structures having one side connected to the first housing or the second housing and another side rotatably connected about the hinge axis along the first rail structure, and comprising a first cam structure;
an intermediate member connected to the hinge bracket to be rotatable about a middle axis perpendicular to the pair of hinge axes between the pair of hinge structures, wherein a second cam structure interoperating with the first cam structure is formed in each of both end portions of the intermediate member; and
an elastic member configured to provide an elastic force to the intermediate member in a direction in which the second cam structure is pressed toward the first cam structure.

17. The hinge assembly of claim 16,
wherein each of the pair of hinge structures comprises:
a first body fastened to the first housing or the second housing; and
a second body extending from the first body, and having a second rail structure rotatably coupled to the first rail structure, and
wherein the first cam structure is formed on one surface of the second rail structure.

18. The hinge assembly of claim 16, wherein the intermediate member comprises:
a central portion rotatably connected to the hinge bracket; and
a pair of extensions extending from the central portion to both sides thereof and comprising the second cam structure formed on one surface thereof.

19. The hinge assembly of claim 16, wherein the elastic force of the elastic member generates torque for rotating the intermediate member in the direction in which the second cam structure is pressed toward the first cam structure.

20. An electronic device comprising:
a display comprising a first area, a second area, and a folding area between the first area and the second area;
a first housing configured to support the first area;
a second housing configured to support the second area; and
a hinge assembly configured to connect the first housing and the second housing and operate between a folded state in which the first area and the second area face each other and an unfolded state in which the first area and the second area do not face each other,
wherein the hinge assembly comprises:
a hinge bracket comprising a pair of first rail structures formed to define a pair of hinge axes,
a pair of hinge structures having one side connected to the first housing or the second housing and another side rotatably connected about the hinge axis along the first rail structure, and comprising a first cam structure,
an intermediate member connected to the hinge bracket to be rotatable about a middle axis perpendicular to the pair of hinge axes between the pair of hinge structures, wherein a second cam structure interoperating with the first cam structure is formed in each of both end portions of the intermediate member, and
an elastic member configured to provide an elastic force to the intermediate member in a direction in which the second cam structure is pressed toward the first cam structure,
wherein each of the pair of hinge structures comprises:
a first body fastened to the first housing or the second housing, and
a second body extending from the first body, and having a second rail structure rotatably coupled to the first rail structure, and the first cam structure is formed on one surface of the second rail structure,
wherein the intermediate member comprises:
a central portion rotatably connected to the hinge bracket; and
a pair of extensions extending from the central portion to both sides thereof and comprising the second cam structure formed on one surface thereof, and wherein the elastic force of the elastic member generates torque for rotating the intermediate member in a direction in which the second cam structure is pressed toward the first cam structure.

\* \* \* \* \*